(12) United States Patent
Shin et al.

(10) Patent No.: US 10,317,971 B2
(45) Date of Patent: Jun. 11, 2019

(54) ELECTRONIC DEVICE AND METHOD FOR CONTROLLING FUNCTIONS THEREOF ACCORDING TO ATTACHMENT OF EXTERNAL DEVICE

(71) Applicant: Samsung Electronics Co., Ltd., Gyeonggi-do (KR)

(72) Inventors: Jaeyoung Shin, Gyeonggi-do (KR); Woongeun Kwak, Gyeonggi-do (KR); Sangyong Kim, Gyeonggi-do (KR); Jinwoo Kim, Seoul (KR); Jungsik Park, Gyeonggi-do (KR); Seungwon Oh, Seoul (KR); Byounguk Yoon, Gyeonggi-do (KR); Sehwan Choi, Gyeonggi-do (KR); Hyunju Hong, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 159 days.

(21) Appl. No.: 15/331,144

(22) Filed: Oct. 21, 2016

(65) Prior Publication Data
US 2017/0115713 A1    Apr. 27, 2017

(30) Foreign Application Priority Data
Oct. 21, 2015 (KR) .......................... 10-2015-0146426

(51) Int. Cl.
*G06F 1/26* (2006.01)
*G06F 1/32* (2019.01)
(Continued)

(52) U.S. Cl.
CPC ............ *G06F 1/266* (2013.01); *G06F 1/1632* (2013.01); *G06F 1/1686* (2013.01); *G06F 1/3296* (2013.01); *G06F 3/017* (2013.01); *G06F 3/03545* (2013.01); *H04W 52/028* (2013.01); *G06F 2200/1632* (2013.01); *G06F 2200/1633* (2013.01); *H02J 7/0029* (2013.01); *H02J 7/0047* (2013.01); *H02J 7/025* (2013.01);
(Continued)

(58) Field of Classification Search
CPC ..... G06F 1/266; G06F 1/3296; H04W 52/028
See application file for complete search history.

(56) References Cited

U.S. PATENT DOCUMENTS 7,668,571 B2 * 2/2010 Na .......................... G06F 1/1688
                                                         381/334
8,838,171 B2 * 9/2014 Jang ........................ G06F 1/266
                                                         455/557

(Continued)

FOREIGN PATENT DOCUMENTS

| KR | 100920664 | 10/2009 |
| KR | 1020120043473 | 5/2012 |
| KR | 1020140073822 | 6/2014 |

*Primary Examiner* — Stefan Stoynov
(74) *Attorney, Agent, or Firm* — The Farrell Law Firm, P.C.

(57) ABSTRACT

Provided are an electronic device and method for controlling functions of the electronic device according to attachment of an external device. The electronic device includes an interface part that electrically contacts an external device, and a processor that determines, when an external device is electrically connected, whether the external device has a second power source, and controls usage of a first power source of the electronic device according to a result of the determination.

15 Claims, 30 Drawing Sheets

(51) Int. Cl.
*H04W 52/02* (2009.01)
*G06F 1/3296* (2019.01)
*G06F 1/16* (2006.01)
*G06F 3/01* (2006.01)
*G06F 3/0354* (2013.01)
*H02J 7/00* (2006.01)
*H02J 7/02* (2016.01)
*H02J 50/10* (2016.01)

(52) U.S. Cl.
CPC ....... *H02J 50/10* (2016.02); *H02J 2007/0039* (2013.01); *Y02D 70/1242* (2018.01); *Y02D 70/1262* (2018.01); *Y02D 70/1264* (2018.01); *Y02D 70/142* (2018.01); *Y02D 70/144* (2018.01); *Y02D 70/164* (2018.01); *Y02D 70/166* (2018.01); *Y02D 70/168* (2018.01); *Y02D 70/26* (2018.01)

(56) References Cited

U.S. PATENT DOCUMENTS

| | | | |
|---|---|---|---|
| 8,952,650 B2* | 2/2015 | Lee | G06F 1/263 320/103 |
| 2010/0121991 A1* | 5/2010 | Kim | H04M 1/72527 710/16 |

* cited by examiner

1110

1120

1102

1200

1230

1240

1310

1400

1410

ELECTRONIC DEVICE AND METHOD FOR CONTROLLING FUNCTIONS THEREOF ACCORDING TO ATTACHMENT OF EXTERNAL DEVICE

PRIORITY

This application claims priority under 35 U.S.C. § 119(a) to a Korean Patent Application filed in the Korean Intellectual Property Office on Oct. 21, 2015 and assigned Serial No. 10-2015-0146426, the contents of which are incorporated herein by reference.

BACKGROUND

1. Field of the Disclosure

The present disclosure relates generally to an electronic device, and more particularly, to an electronic device and a method for managing power when an external device is attached to the electronic device.

2. Description of the Related Art

A mobile device may be coupled with an external device designed to have a specialized function and may be used in tandem with the external device. Such an external device attachable to the mobile device may enhance a specific function of the mobile device, such as a camera or speaker function.

When an external device is coupled to the mobile device, the power of the external device may be controlled according to power management of the mobile device. For example, when a universal serial bus (USB) interface is used for connecting an external device to the mobile device, the external device may be supplied with power from the power source of the mobile device via the USB interface. As another example, when an external device having a separate power source such as a battery or charging adapter is connected to the mobile device via a USB interface, the battery of the mobile device may be charged by the power source of the external device.

Although an external device has a separate power source, when the external device is connected to the mobile device, power supply between the mobile device and the external device may depend on power management of the mobile device, which may indicate that the external device may consume power of the mobile device during operation. In this manner, the power source of the mobile device rapidly discharges, causing inefficiency in power usage.

As such, there is a need in the art for a device and method that prevent such inefficient power loss in the mobile device when it is attached to an external device.

SUMMARY

Aspects of the present disclosure are to address at least the above mentioned problems and/or disadvantages and to provide at least the advantages described below.

Accordingly, an aspect of the present disclosure is to provide a means that enables a mobile device to avoid inefficiency in power usage when an external device is attached to the mobile device.

Another aspect of the present disclosure is to provide a means that enables a mobile device coupled with an external device to optimize the operational performance of the mobile device according to the type and state of the external device.

In accordance with an aspect of the present disclosure, there is provided an electronic device including a housing including a first face and a second face in an opposite direction of the first face, a coupling member placed on the first face of the housing to removably receive an external device, a first power source arranged in the housing, a power management integrated circuit electrically connected with the first power source, a processor electrically connected with the first power source and the power management integrated circuit, and a memory electrically connected with the processor, the memory storing instructions that, when executed, cause the processor to perform a process of determining whether the external device has a second power source, supplying, when the external device has a second power source, a first level of power from the second power source to the power management integrated circuit, and supplying, when the external device does not have a second power source, a second level of power from the first power source to the power management integrated circuit.

In accordance with another aspect of the present disclosure, there is provided an electronic device including a housing including a first face and a second face in an opposite direction of the first face, a touchscreen display arranged in a region of the first face, a camera arranged in a region of the second face, a groove placed separately from the camera on the second face of the housing to receive a removable external device and enable the removable external device to be at least partially exposed, a plurality of contacts placed in the groove that electrically contacts the removable external device, a processor arranged in the housing, and a memory arranged in the housing and electrically connected with the processor, wherein the memory stores instructions that, when executed, cause the processor to perform a process of determining whether a removable external device is installed in the groove, and, when a removable external device is installed in the groove, executing a piece of software for interworking between a camera of the external device and the camera of the electronic device, and outputting a user interface on the touchscreen display to receive user input for controlling camera interworking.

In accordance with another aspect of the present disclosure, there is provided an electronic device including an interface part that electrically contacts an external device, and a processor that determines, when an external device is electrically connected, whether the external device has a second power source, and controls usage of a first power source of the electronic device according to a result of the determination.

BRIEF DESCRIPTION OF THE DRAWINGS

The above and other aspects, features, and advantages of certain embodiments of the present disclosure will be more apparent from the following detailed description taken in conjunction with the accompanying drawings, in which.

DETAILED DESCRIPTION OF EMBODIMENTS OF THE DISCLOSURE

Figure 1:
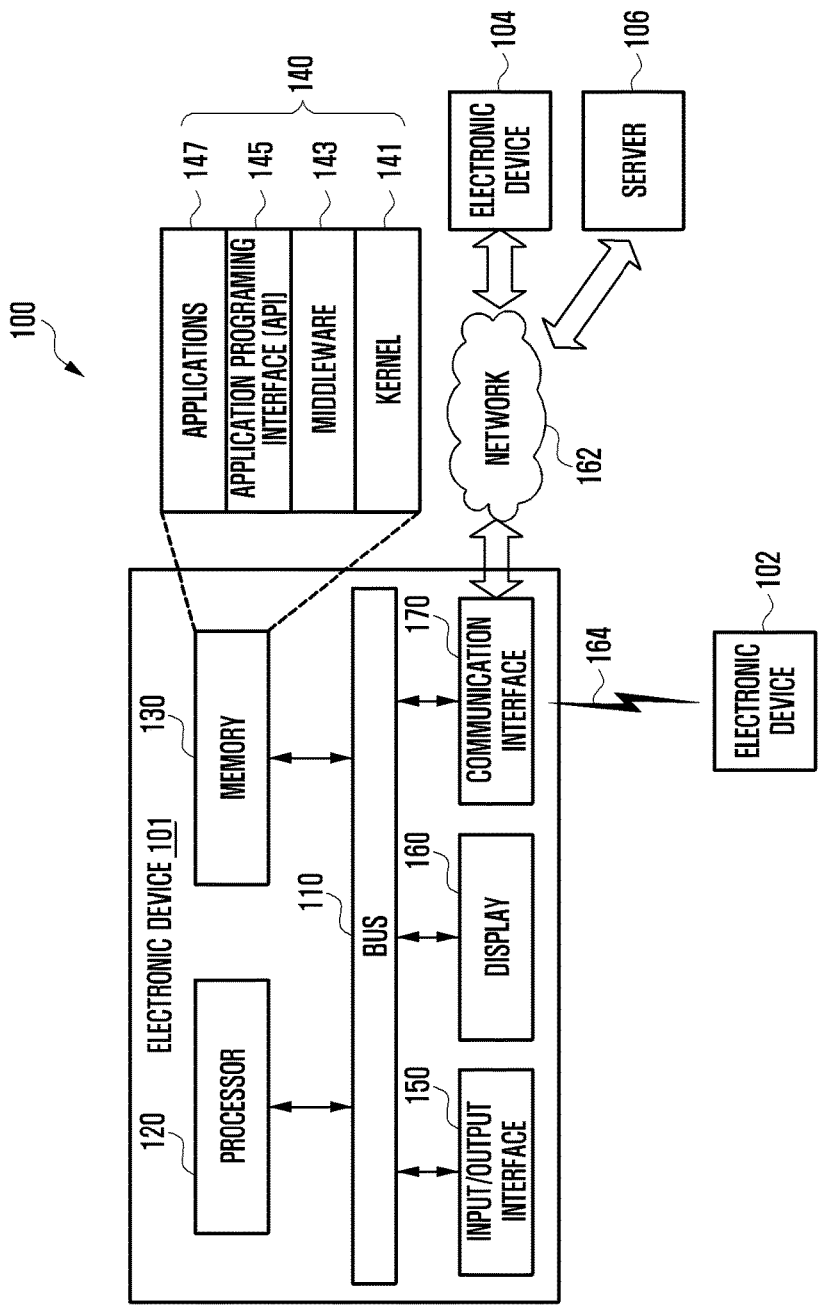
FIG. 1 illustrates a network environment including electronic devices according to embodiments of the present disclosure.

Hereinafter, the present disclosure is described with reference to the accompanying drawings. Although specific embodiments are illustrated in the drawings and related detailed descriptions are discussed in the present specification, the present disclosure may have various modifications and several embodiments. However, embodiments of the present disclosure are not limited to a specific implementation form and it should be understood that the present disclosure includes all changes and/or equivalents and substitutes included in the spirit and scope of embodiments of the present disclosure. In connection with descriptions of the drawings, similar components are designated by the same reference numeral.

In embodiments of the present disclosure, expressions such as "include", "have", "may include" or "may have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

In embodiments of the present disclosure, the expressions "or" or "at least one of A or/and B" include any or all of combinations of words listed together. For example, the expressions "A or B" or "at least A or/and B" may include A, B, or both A and B.

The terms "1", "2", "first", or "second" used in embodiments of the present disclosure may modify various components of the embodiments but do not limit the corresponding components. For example, the above terms do not limit the sequence and/or importance of the components, and may be used for distinguishing one component from other components. For example, a first user device and a second user device indicate different user devices although both are user devices. For example, without departing from the scope of the present disclosure, a first structural element may be referred to as a second structural element, and the second structural element also may be referred to as the first structural element.

When it is stated that a component is "(operatively or communicatively) coupled to" or "connected to" another component, the component may be directly coupled or connected to another component or a new component may exist between the component and another component. In contrast, when it is stated that a component is "directly coupled to" or "directly connected to" another component, a new component does not exist between the component and another component. In the present disclosure, the expression "configured (or set) to do" may be used interchangeably with, for example, "suitable for doing," "having the capacity to do," "designed to do," "adapted to do," "made to do," or "capable of doing." The expression "configured (or set) to do" may not be used to refer to only something in hardware for which it is "specifically designed to do." Instead, the expression "a device configured to do" may indicate that the device is "capable of doing" something with other devices or parts. For example, the expression "a processor configured (or set) to do A, B and C" may refer to a dedicated processor, such as an embedded processor or a generic-purpose processor, such as a central processing unit (CPU) or application processor that may execute one or more software programs stored in a memory device to perform corresponding functions.

According to embodiments of the present disclosure, examples of the electronic device may include a smartphone, a tablet personal computer (PC), a mobile phone, a video phone, an electronic book reader, a desktop PC, a laptop PC, a netbook computer, a workstation, a server, a personal digital assistant (PDA), a portable multimedia player (PMP), an MP3 player, a medical device, a camera, and a wearable device. Examples of the wearable device may include an accessory type device (such as, watch, ring, bracelet, ankle bracelet, necklace, glasses, contact lens, and head-mounted device (HMD), a textile or clothes type device such as electronic clothes, a body-attached type such as a skin pad and tattoo, and a bio-implemented type. Examples of the electronic device may include a television, a digital video disc (DVD) player, an audio player, a refrigerator, an air conditioner, a cleaner, an oven, a microwave oven, a laundry machine, an air purifier, a set-top box, a home automation control panel, a security control panel, a media box such as Samsung HomeSync™, apple TV™, and google TV™, a game console such as Xbox™ and PlayStation™, an electronic dictionary, an electronic key, a camcorder, and an electronic frame.

According to an embodiment, examples of the electronic device may include a medical device (such as portable medical sensors (including glucometer, heart rate sensor, tonometer, and body thermometer), magnetic resonance angiography (MRA) device, magnetic resonance imaging (MRI) device, computed tomography (CT) device, camcorder, and microwave scanner), a navigation device, a global navigation satellite system (GNSS), an event data recorder (EDR), a flight data recorder (FDR), an automotive infotainment device, marine electronic equipment (such as marine navigation system and gyro compass), aviation electronics (avionics), an automotive head unit, an industrial or household robot, an automated teller machine (ATM), a point of sales (POS) terminal, and an Internet-of-Things (IoT) device, such as an electric light bulb, sensor, sprinkler system, fire alarm system, temperature controller, street lamp, toaster, fitness equipment, hot water tank, heater, and boiler.

According to an embodiment of the present disclosure, examples of the electronic device may include furniture, a building/structure, a part of a vehicle, an electronic board, an electronic signature receiving device, a projector, and a sensor (such as water, electricity, gas, and electric wave meters). The electronic device may be flexible or a combination of at least two of the aforementioned devices, but the electronic device is not limited to the aforementioned devices.

In the present disclosure, the term "user" may denote a person who uses the electronic device or an artificial intelligence electronic device which uses the electronic device.

FIG. 1 illustrates a network environment including electronic devices according to embodiments of the present disclosure.

Referring to FIG. 1, an electronic device 101, in a network environment 100, includes a bus 110, a processor 120, a memory 130, an input/output interface 150, a display 160, and a communication interface 170. According to some embodiment, the electronic device 101 may omit at least one of the components or further include another component.

The bus 110 may be a circuit connecting the above described components and transmitting communication, such as a control message between the above described components.

The processor 120 may include one or more of a central processing unit (CPU), application processor (AP) or communication processor (CP). For example, the processor 120 may control at least one component of the electronic device 101 and/or execute calculation relating to communication or data processing.

The memory 130 may include volatile and/or non-volatile memory. For example, the memory 130 may store command or data relating to at least one component of the electronic device 101, and may store software and/or program 140. For example, the program 140 may include a kernel 141, middleware 143, an application programming interface (API) 145, and/or applications 147. At least one portion of the kernel 141, the middleware 143 and the API 145 may be defined as operating system (OS).

The kernel 141 controls or manages system resources, such as the bus 110, the processor 120, or the memory 130, used for executing an operation or function implemented by the remaining other program, for example, the middleware 143, the API 145, or the applications 147. The kernel 141 provides an interface for accessing individual components of the electronic device 101 from the middleware 143, the API 145, or the applications 147 to control or manage the components.

The middleware 143 performs a relay function of allowing the API 145 or the applications 147 to communicate with the kernel 141 to exchange data.

Further, in operation requests received from the applications 147, the middleware 143 performs a control for the operation requests, such as scheduling or load balancing, by using a method of assigning a priority, by which the system resources of the electronic device 101 may be used, to the applications 147.

The API 145 is an interface by which the applications 147 may control a function provided by the kernel 141 or the middleware 143 and includes, for example, at least one interface or function for a file control, a window control, image processing, or a character control.

The input/output interface 150 may be interface to transmit command or data inputted by a user or another external device to another component(s) of the electronic device 101. The input/output interface 150 may output the command or data received from the other component(s) of the electronic device 101 to the user or the other external device.

The display 160 may include, for example, liquid crystal display (LCD), light emitting diode (LED), organic LED (OLED), or micro electro mechanical system (MEMS) display, or electronic paper display. The display 160 may display, for example, various contents (text, image, video, icon, or symbol, and so on) to a user. The display 160 may include a touch screen, and receive touch, gesture, approaching, or hovering input using a part of body of the user.

The communication interface 170 may set communication of the electronic device 101 and an external device, such as a first external device 102, a second external device 104, or a server 106. For example, the communication interface 170 may be connected with the network 162 through wireless communication or wire communication and communicate with the external device, such as, a second external device 104 or server 106).

Wireless communication may use, as cellular communication protocol, at least one of LTE (long-term evolution), LTE-A (LTE Advanced), CDMA (code division multiple access), WCDMA (wideband CDMA), UMTS (universal mobile telecommunications system), WiBro (wireless broadband), and GSM (global system for mobile Communications) for example. A short-range communication 164 may include, for example, at least one of Wi-Fi, Bluetooth, near field communication (NFC), magnetic secure transmission or near field magnetic data stripe transmission (MST), and global navigation satellite system (GNSS). The GNSS may include at least one of, for example, a global positioning system (GPS), a global navigation satellite system (Glonass), a Beidou navigation satellite system (Beidou), and Galileo (European global satellite-based navigation system). Hereinafter, GPS may be interchangeably used with GNSS in the present disclosure.

Wired communication may include, for example, at least one of USB (universal serial bus), HDMI (high definition multimedia interface), RS-232 (recommended standard-232), and POTS (plain old telephone service). The network 162 may include a telecommunication network, for example, at least one of a computer network, such as LAN (local area network) or WAN (wide area network), the Internet, and a telephone network.

Each of the first external device 102 and the second external device 104 may be the same as or a different type of device than the electronic device 101. According to some embodiment, the server 106 may include one or more group of servers. At least one portion of executions executed by the electronic device may be performed by one or more electronic devices, such as external electronic device 102, 104, or server 106. When the electronic device 101 should perform a function or service automatically, the electronic device 101 may request performing of at least one function to the other device. For the above, cloud computing technology, distributed computing technology, or client-server computing technology may be used, for example.

Figure 2:
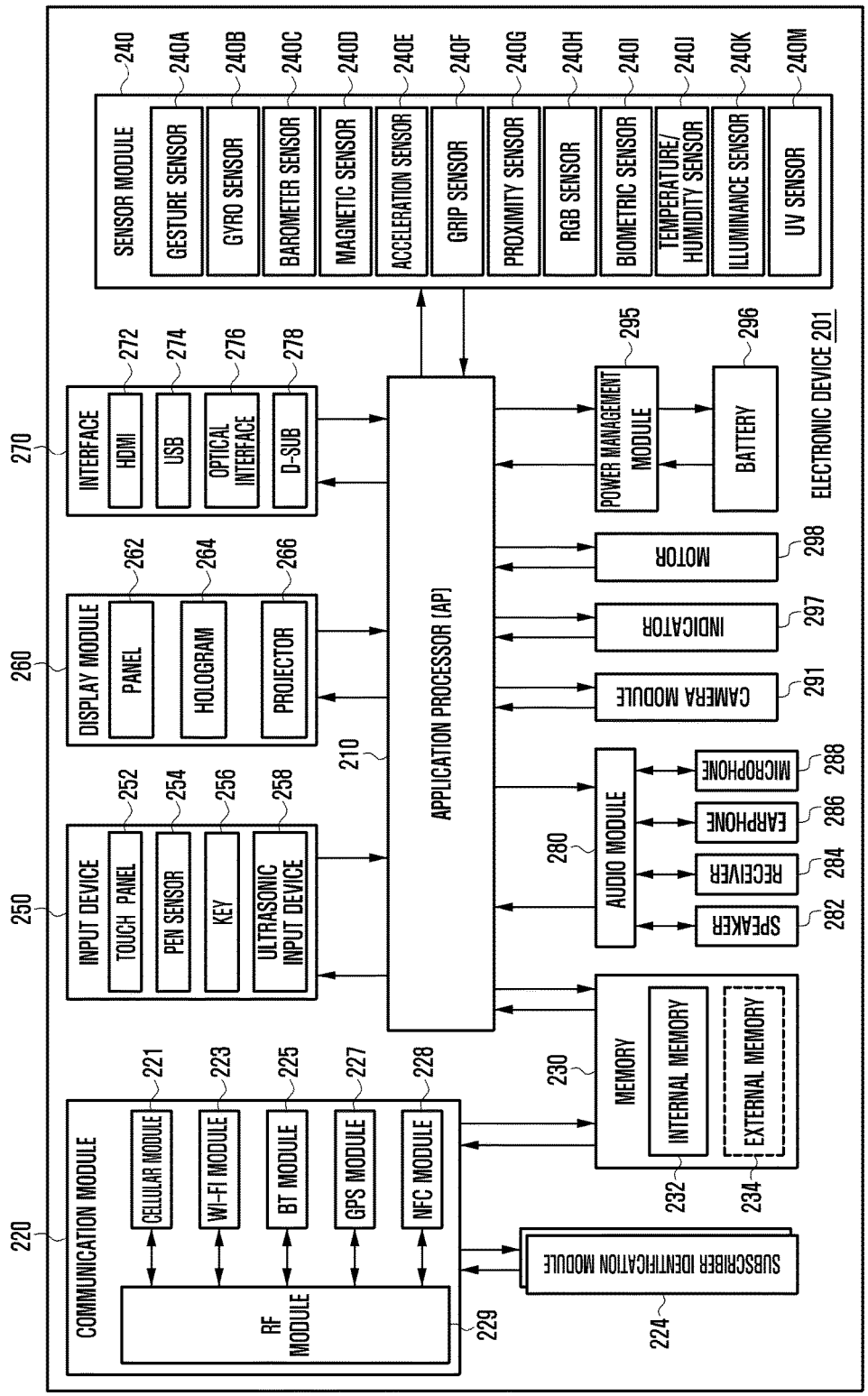
FIG. 2 illustrates an electronic device according to embodiments of the present disclosure.

FIG. 2 illustrates a block diagram of an electronic device according to embodiments of the present disclosure.

Referring to FIG. 2, an electronic device 201 may configure all or a part of the electronic device 101 illustrated in FIG. 1. The electronic device 201 includes one or more APs 210, a communication module 220, a subscriber identification module (SIM) card 224, a memory 230, a sensor module 240, an input device 250, a display module 260, an interface 270, an audio module 280, a camera module 291, a power management module 295, a battery 296, an indicator 297, and a motor 298.

The AP 210 operates an OS or an application program so as to control a plurality of hardware or software component elements connected to the AP 210 and execute various data processing and calculations including multimedia data. The AP 210 may be implemented by a system on chip (SoC), for example. According to an embodiment, the processor 210 may further include a graphics processing unit (GPU) and/or image signal processor. The AP 210 may include at least one portion of components illustrated in FIG. 2, such as a cellular module 221. The AP 210 may load command or data received from at least one of another component, such as a non-volatile memory, and store various data in the non-volatile memory.

The communication module 220 may include same or similar components with the communication interface 170 of FIG. 1, and may include the cellular module 221, a Wi-Fi module 223, a BT module 225, a GPS module 227, a NFC module 228, and a radio frequency (RF) module 229.

The cellular module 221 provides a voice, a call, a video call, a short message service (SMS), or an Internet service through a communication network, such as LTE, LTE-A, CDMA, WCDMA, UMTS, WiBro, or GSM. The cellular module 221 may distinguish and authenticate electronic devices within a communication network by using a SIM card 224. According to an embodiment, the cellular module 221 performs at least some of the functions which may be provided by the AP 210. For example, the cellular module 221 may perform at least some of the multimedia control functions, and may include a CP.

Each of the Wi-Fi module 223, the BT module 225, the GPS module 227, and the NFC module 228 may include, for example, a processor for processing data transmitted/received through the corresponding module.

Although the cellular module 221, the Wi-Fi module 223, the BT module 225, the GPS module 227, and the NFC module 228 are at least two of the cellular module 221, the Wi-Fi module 223, the BT module 225, the GPS module 227, and the NFC module 228 may be included in one integrated chip (IC) or one IC package according to one embodiment. For example, at least the CP corresponding to the cellular module 221 and the Wi-Fi processor corresponding to the Wi-Fi module 223 of the processors corresponding to the cellular module 221, the Wi-Fi module 223, the BT module 225, the GPS module 227, and the NFC module 228 may be implemented by one SoC.

The RF module 229 transmits/receives data, such as an RF signal and may include, for example, a transceiver, a power amp module (PAM), a frequency filter, and a low noise amplifier (LNA). The RF module 229 may further include a component for transmitting/receiving electronic waves over a free air space in wireless communication, for example, a conductor or a conducting wire.

Although the cellular module 221, the Wi-Fi module 223, the BT module 225, the GPS module 227, and the NFC module 228 share one RF module 229 in FIG. 2, at least one of the cellular module 221, the Wi-Fi module 223, the BT module 225, the GPS module 227, and the NFC module 228 may transmit/receive an RF signal through a separate RF module according to one embodiment.

The SIM card 224 includes a SIM and may be inserted into a slot formed in a particular portion of the electronic device. The SIM card 224 includes unique identification information, such as an integrated circuit card identifier (ICCID) or subscriber information, such as an international mobile subscriber identity (IMSI).

The memory 230 may include an internal memory 232 or an external memory 234. The internal memory 232 may include, for example, at least one of a volatile memory, such as, a random access memory (RAM), a dynamic RAM (DRAM), a static RAM (SRAM), and a synchronous dynamic RAM (SDRAM) and a non-volatile Memory, such as, a read only memory (ROM), a one time programmable ROM (OTPROM), a programmable ROM (PROM), an erasable and programmable ROM (EPROM), an electrically erasable and programmable ROM (EEPROM), a mask ROM, a flash ROM, a not and (NAND) flash memory, and a not or (NOR) flash memory.

According to an embodiment, the internal memory 232 may be a solid state drive (SSD). The external memory 234 may further include a flash drive, such as a compact flash (CF), a secure digital (SD), a micro-SD, a mini-SD, an extreme digital (xD), or a memory stick. The external memory 234 may be functionally connected to the electronic device 201 through various interfaces. According to an embodiment, the electronic device 201 may further include a storage device (or storage medium) such as a hard drive.

The sensor module 240 measures a physical quantity or detects an operation state of the electronic device 201, and converts the measured or detected information to an electronic signal. The sensor module 240 may include, for example, at least one of a gesture sensor 240A, a gyro sensor 240B, an atmospheric pressure (barometric) sensor 240C, a magnetic sensor 240D, an acceleration sensor 240E, a grip sensor 240F, a proximity sensor 240G, a color sensor 240H, such as, red, green, and blue (RGB) sensor) 240H, a biometric sensor 240I, a temperature/humidity sensor 240J, an illumination (light) sensor 240K, and a ultraviolet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an infrared (IR) sensor, an iris sensor, and a fingerprint sensor. The sensor module 240 may further include a control circuit for controlling one or more sensors included in the sensor module 240. In embodiments, the electronic device 201 is capable of including a processor, configured as part of the processor 210 or a separate component, for controlling the sensor module 240. In this case, while the processor 210 is operating in a sleep mode, the processor is capable of controlling the sensor module 240.

The input device 250 includes a touch panel 252, a (digital) pen sensor 254, a key 256, and an ultrasonic input device 258. For example, the touch panel 252 may recognize a touch input in at least one type of a capacitive type, a resistive type, an infrared type, and an acoustic wave type. The touch panel 252 may further include a control circuit. In the capacitive type, the touch panel 252 may recognize proximity as well as a direct touch. The touch panel 252 may further include a tactile layer that provides a tactile reaction to the user.

The (digital) pen sensor 254 may be implemented, for example, using a method identical or similar to a method of receiving a touch input of the user, or using a separate recognition sheet. The key 256 may include, for example, a physical button, an optical key, or a key pad. The ultrasonic input device 258 may detect an acoustic wave by a microphone 288 of the electronic device 201 through an input means generating an ultrasonic signal to identify data and may perform wireless recognition.

The display 260 includes a panel 262, a hologram device 264, and a projector 266. The panel 262 may be, for example, a LCD or an active matrix OLED (AM-OLED). The panel 262 may be implemented to be flexible, transparent, or wearable and may be configured by the touch panel 252 and one module. The hologram device 264 displays a stereoscopic image in the air by using interference of light. The projector 266 projects light on a screen to display an image. For example, the screen may be located inside or outside the electronic device 201. According to an embodiment, the display 260 may further include a control circuit for controlling the panel 262, the hologram device 264, and the projector 266.

The interface 270 includes, for example, a HDMI 272, an USB 274, an optical interface 276, and a D-subminiature (D-sub) 278, and may be included in, for example, the communication interface 170 illustrated in FIG. 1. Additionally or alternatively, the interface 270 may include, for example, a mobile high-definition link (MHL) interface, an SD card/multi-media card (MMC), or an infrared data association (IrDA) standard interface.

The audio module 280 bi-directionally converts a sound and an electronic signal. At least some components of the audio module 280 may be included in, for example, the input/output interface 150 illustrated in FIG. 1. The audio module 280 processes sound information input or output through, for example, a speaker 282, a receiver 284, an earphone 286, or the microphone 288.

The camera module 291 may photograph a still image and a video, and may include one or more image sensors, such as a front sensor or a back sensor, an image signal processor (ISP) or a flash, such as an LED (light emitting diode) or a xenon lamp.

The power managing module 295 manages power of the electronic device 201. The power managing module 295 may include, for example, a power management integrated circuit (PMIC), a charger IC, or a battery gauge.

The PMIC may be mounted to, for example, an integrated circuit or a SoC semiconductor. A charging method may be divided into wired and wireless methods. The charger IC charges a battery and prevents over-voltage or over-current from flowing from a charger. According to an embodiment, the charger IC includes a charger IC for at least one of the wired charging method and the wireless charging method. The wireless charging method may include, for example, a magnetic resonance, magnetic induction and electromagnetic wave method, and additional circuits for wireless charging, such as a coil loop, a resonant circuit, and a rectifier may be added.

The battery gauge measures, for example, a remaining quantity of the battery 296, or a voltage, a current, or a temperature during charging. The battery 296 may store or generate electricity and supply power to the electronic device 201 by using the stored or generated electricity. The battery 296 may include a rechargeable battery or a solar battery.

The indicator 297 displays particular statuses of the electronic device 201 or a part of the electronic device 201, such as a booting, message, or charging status. The motor 298 converts an electrical signal to a mechanical vibration. The electronic device 201 may include a processing unit, such as a GPU for supporting a mobile TV. The processing unit for supporting the mobile TV may process, for example, media data according to a standard of digital multimedia broadcasting (DMB), digital video broadcasting (DVB), or media flow.

Each of the components of the electronic device according to embodiments of the present disclosure may be implemented by one or more components and the name of the corresponding component may vary depending on a type of the electronic device. The electronic device according to embodiments of the present disclosure may include at least one of the above described components, a few of the components may be omitted, or additional components may be further included. Some of the components of the electronic device according to embodiments of the present disclosure may be combined to form a single entity, and thus may equivalently execute functions of the corresponding components before being combined.

Figure 3:
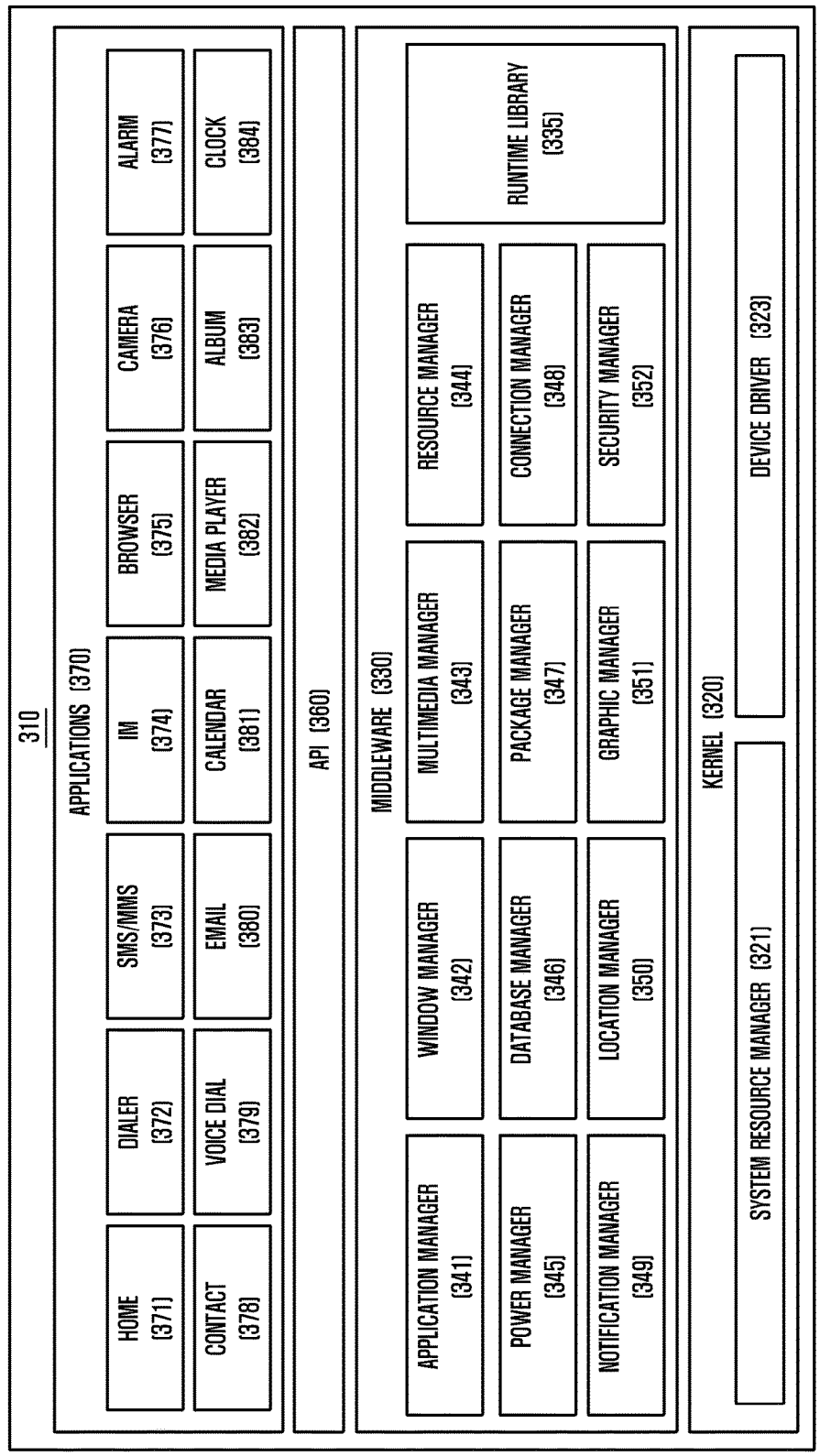
FIG. 3 illustrates a program module according to embodiments of the present disclosure.

FIG. 3 is a block diagram illustrating a programming module according to embodiments of the present disclosure.

Referring to FIG. 3, a programming module 310 may be stored in the electronic apparatus 100, e.g. the memory 130, as illustrated in FIG. 1. At least a part of the programming module 310 may be configured by software, firmware, hardware, and/or combinations of two or more thereof. The programming module 310 may include an OS that is implemented in hardware 200 to control resources related to an electronic device 100, and/or various applications driven on the OS. For example, the OS may be Android, iOS, Windows, Symbian, Tizen, or Bada.

Referring to FIG. 3, the programming module 310 may include a kernel 320, middleware 330, an API 360, and the applications 370 applications 147. At least part of the program module 310 may be preloaded on the electronic device or downloaded from a server.

The kernel 320 may include a system resource manager 321 and/or a device driver 323. The system resource manager 321 may include, for example, a process manager, a memory manager, and a file system manager. The system resource manager 321 may control, allocate, and/or collect system resources. The device driver 323 may include, for example, a display driver, a camera driver, a BT driver, a shared memory driver, a USB driver, a keypad driver, a Wi-Fi driver, and an audio driver and an inter-process communication (IPC) driver.

The middleware 330 may include a plurality of modules implemented in advance for providing functions commonly used by the applications 370. The middleware 330 may provide the functions through the API 360 such that the applications 370 may efficiently use restricted system resources within the electronic apparatus. For example, as shown in FIG. 3, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a location manager 350, a graphic manager 351, and a security manager 352.

The runtime library 335 may include a library module that a compiler uses in order to add a new function through a programming language while one of the applications 370 is being executed. According to an embodiment, the runtime library 335 may perform an input/output, memory management, and/or a function for an arithmetic function.

The application manager 341 may manage a life cycle of at least one of the applications 370. The window manager 342 may manage graphical user interface (GUI) resources used by a screen. The multimedia manager 343 may detect formats used for reproduction of various media files, and may perform encoding and/or decoding of a media file by using a codec suitable for the corresponding format. The resource manager 344 may manage resources such as a source code, a memory, and a storage space of at least one of the applications 370.

The power manager 345 may manage a battery and/or power, while operating together with a basic input/output system (BIOS), and may provide power information used for operation. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi or BT. The notification manager 349 may display and/or notify of an event, such as an arrival message, a promise, and a proximity notification, in such a manner that does not disturb a user. The location manager 350 may manage location information of an electronic apparatus. The graphic manager 351 may manage a graphic effect which will be provided to a user, and/or a user interface related to the graphic effect. The security manager 352 may provide all security functions used for system security and/or user authentication. According to an embodiment, when an electronic apparatus 100 has a telephone call function, the middleware 330 may further include a telephony manager for managing a voice and/or video communication function of the electronic apparatus.

The middleware 330 may generate and use a new middleware module through various functional combinations of the aforementioned internal element modules. The middleware 330 may provide modules specialized according to types of OSs in order to provide differentiated functions. The middleware 330 may dynamically remove some of the existing elements and/or add new elements, and may exclude some of the elements described in the embodiments of the present disclosure, further include other elements, and/or substitute the elements with elements having a different name and performing a similar function.

The API 360 is a set of API programming functions, and may be provided with a different configuration according to the OS. For example, in Android or iOS, one API set may be provided for each of platforms, and in Tizen, two or more API sets may be provided.

The applications 370 may include applications for performing various functions, e.g., home 371, diary 372, SMS/MMS 373, instant message (IM) 374, browser 375, camera 376, alarm 377, contact 378, voice dial 379, email 380, calendar 381, media player 382, album 383, clock 384, health care, such as an application for measuring amount of exercise or blood sugar level, and environment information, such as, an application for providing atmospheric pressure, humidity, or temperature.

According to an embodiment, the applications 370 are capable of including an application for supporting information exchange between an electronic device and an external device. The information exchange application is capable of including a notification relay application for relaying specific information to external devices or a device management application for managing external devices.

For example, the notification relay application is capable of including a function for relaying notification information, created in other applications of the electronic device, such as a short messaging service/multimedia messaging service (SMS/MMS) application, email application, health care application, or environment information application to external devices. In addition, the notification relay application is capable of receiving notification information from external devices to provide the received information to the user.

The device management application is capable of managing at least one function of an external device communicating with the electronic device. Examples of the function are turning-on/off the external device or part of the external device, controlling the brightness (or resolution) of the display, applications running on the external device, and services provided by the external device such as a call or messaging service.

According to an embodiment, the applications 370 may include a health care application of a mobile medical device, and specified attributes of an external device. The applications 370 are capable of including applications received from an external device, and a preloaded application or third party applications that can be downloaded from a server. It should be understood that the components of the program module 310 may be called different names according to types of operating systems.

According to embodiments, at least part of the program module 310 can be implemented with software, firmware, hardware, or any combination of two or more of them. At least part of the program module 310 can be implemented by a processor. At least part of the programming module 310 may include modules, programs, routines, sets of instructions or processes, etc., in order to perform one or more functions.

The term "module" used in the present disclosure may refer to, for example, a unit including at least one combination of hardware, software, and firmware. The "module" may be interchangeably used with a term, such as unit, logic, logical block, component, and/or circuit. The "module" may be a minimum unit of an integrally configured article and/or a part thereof, may be a minimum unit performing at least one function and/or a part thereof, and may be mechanically and/or electronically implemented. For example, the "module" according to the present disclosure may include at least one of an application-specific IC (ASIC) chip, a field-programmable gate arrays (FPGA), and a programmable-logic device for performing operations which have been known and/or are to be developed.

According to embodiments, at least part of the devices or the method according to the present disclosure may be implemented by a command stored in a computer-readable storage medium in a programming module form. When the instructions are executed by at least one processor, the at least one processor may perform functions corresponding to the instructions. The computer-readable storage medium may be, for example, the memory 130. At least a part of the programming module may be implemented by the processor 120. At least some of the programming modules may include, for example, a module, a program, a routine, a set of instructions or a process for performing one or more functions.

The computer-readable recording medium may include magnetic media such as a hard disk, a floppy disk, and a magnetic tape, optical media such as a compact disc ROM (CD-ROM) and a DVD, magneto-optical media such as a floptical disk, and hardware devices specially configured to store and perform a program instruction, such as a ROM, a RAM, or a flash memory. In addition, the program instructions may include high class language codes, which may be executed in a computer by using an interpreter, as well as machine codes made by a compiler. The aforementioned hardware device may be configured to operate as one or more software modules in order to perform the operation of the present disclosure, and vice versa.

The module or programming module of the present disclosure may include at least one of the aforementioned components with omission of some components or addition of other components. The operations of the modules, programming modules, or other components may be executed in series, in parallel, recursively, or heuristically. Some operations may be executed in a different order, omitted, or extended with other operations.

FIGS. 4A, 4B, 4C and 4D illustrate the configuration of the electronic device 101 according to embodiments of the present disclosure.

Figure 4A:
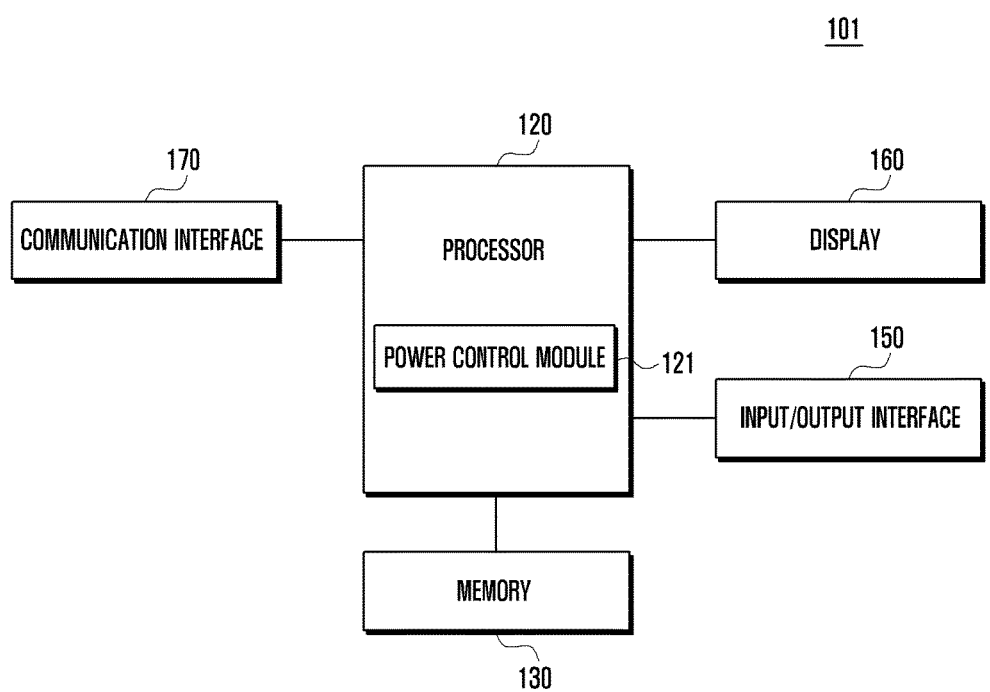
FIGS. 4A, 4B, 4C and 4D illustrate the configuration of the electronic device according to embodiments of the present disclosure.

Referring to FIG. 4A, the electronic device 101 may include a display 160, an input/output interface 150, a memory 130, a communication interface 170, and a processor 120 that may include a power control module 121.

The display 160 may be realized using liquid crystal display (LCD) elements, organic light emitting diodes (OLED), or active matrix light emitting diodes (AMOLED). The display 160 may present various information such as menus, input data, and function setting information in a visual form to the user.

In one embodiment, when an external device is attached to the electronic device, the display 160 may display a notification indicating attachment of the external device and the type thereof. The display 160 may also display a screen of an application associated with the function of the external device automatically executed in response to attachment. The display 160 may display information on the coupling state of the external device. For example, the display 160 may display information indicating whether the external device is coupled in the forward or reverse direction or information on the coupled location.

In particular, when the external device has a battery, the display 160 may display a power source selection menu enabling selection between the battery of the external device and the battery of the electronic device. When an external device having a battery is coupled to the electronic device, the display 160 may display an indication for the aggregate remaining battery power corresponding to the sum of the remaining battery power of the electronic device and the remaining battery power of the external device.

The display 160 may also display information on the modified or reinforced function according to attachment of the external device.

The display 160 may be used to receive user input such as touch input or key input for controlling operation of the electronic device. The input/output interface 150 may receive user input for sending multimedia data from the electronic device to another electronic device. To support a touch sensor, the input/output interface 150 may be combined with the display 160.

In one embodiment, when an external device is attached to the electronic device, the input/output interface 150 may receive user input for selecting the battery to be used among the battery of the external device and the battery of the electronic device, and for executing a function of the attached external device.

The memory 130 may store programs and data needed for operation of the electronic device, such as for selecting the power source to be used. For example, the memory 130 may store power control data needed to address various situations, such as when the attached external device has no battery and when the remaining battery power of the attached external device is greater than that of the electronic device. The memory 130 may also store a threshold value for battery power comparison, such as a threshold value used to determine whether the remaining battery power of the electronic device is less than the threshold value. This is one of the conditions to be satisfied when the battery of the external device can be used instead of the battery of the electronic device. The memory 130 may also store a program and data needed for comparing the remaining battery power of the electronic device with the threshold value, and for comparing the remaining battery power of the electronic device with that of the external device attached to the electronic device.

The communication interface 170 may perform wired or wireless communication with another device, may include a radio frequency (RF) transmitter for up-converting the frequency of a signal to be transmitted and amplifying the signal, and an RF receiver for low-noise amplifying a received signal and down-converting the frequency of the signal, may include a mobile communication module for LTE or CDMA, a digital broadcast receiver module for DMB or DVB, a wireless Internet access module for Wi-Fi or WiBro, and a short-range communication module for NFC or Bluetooth, and may support close proximity wireless communication based on the mmWave band.

In one embodiment, the communication interface 170 may support coupling and data transmission between the electronic device and an external device through short-range communication, in which case the communication interface 170 may receive ID information of the external device.

The processor 120 may control the overall operation of the electronic device and signal flows between internal components thereof. In particular, the processor 120 may determine whether an external device is coupled or attached to the electronic device 101. When an external device is attached to or detached from the electronic device 101, the processor 120 may control the display 160 to output a corresponding notification window.

When an external device is attached to the electronic device 101, the processor 120 may automatically initiate execution of an application associated with a function of the external device. Automatic application execution may be not initiated according to user settings. The processor 120 may at least partially control the function of the electronic device 101 so that the function of the external device is smoothly executed.

The processor 120 may determine whether an external device attached to the external device has a battery. In this regard, the processor 120 may control display of an indication for the aggregate remaining battery power corresponding to the sum of the remaining battery power of the electronic device and the remaining battery power of the external device.

When an external device is attached to the electronic device, the processor 120 may compare the remaining battery power of the electronic device with that of the external device. If the remaining battery power of the electronic device is less than that of the external device and is less than a preset threshold, the processor 120 may control an operation to preferentially use the battery of the external device. When an external device attached to the electronic device has no battery, the processor 120 may control at least a function of the electronic device to reduce power consumption. For example, when an external device without a battery is attached to the electronic device, the processor 120 may control the electronic device to operate in low-power mode.

Figure 4B:
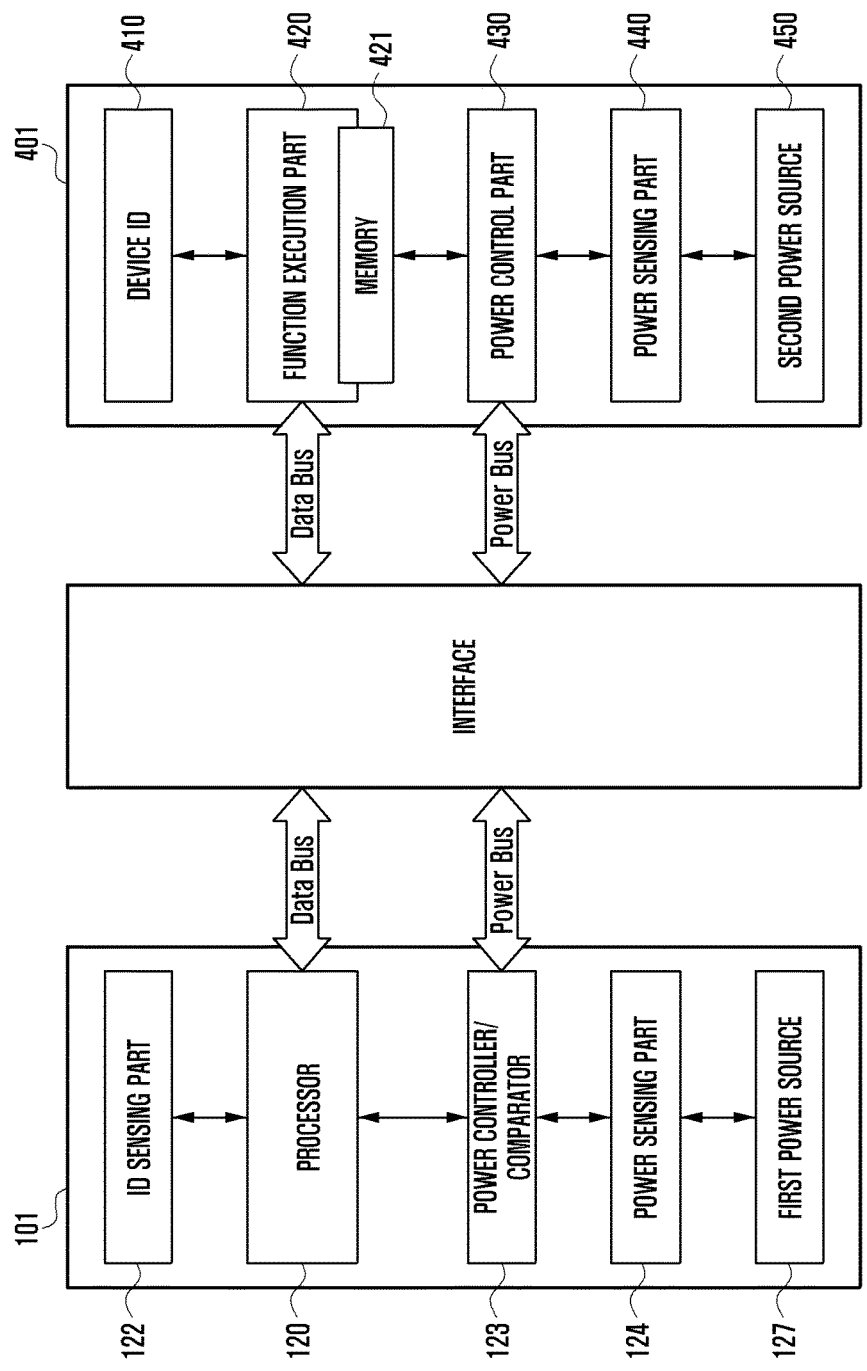

FIG. 4B illustrates components of the electronic device 101, components of the external device 401, and connection links between the electronic device 101 and the external device 401 according to embodiments of the present disclosure.

The components of the electronic device 101 shown in FIG. 4B are subcomponents required for power control due to coupling with the external device 401 among those components shown in FIG. 4A. The power control module 121 of FIG. 4A may correspond to the power controller/comparator 123, power sensing part 124, and first power source 127 of FIG. 4B. The electronic device 101 may further include an ID sensing part 122. The ID sensing part 122 may be included in the processor 120 depending upon implementation.

In embodiments, the electronic device 101 may include an ID sensing part 122, a processor 120, a power controller/comparator 123, a power sensing part 124, and a first power source 127, and may exchange data with an external device 401 via an inter-device interface.

The external device 401 may be electrically connected to the electronic device 101 and exchange data therewith, and may include a function execution part 420 with a memory 421, a power control part 430, a power sensing part 440, a second power source 450, and a means to store a device ID 410.

When the external device 401 is electrically connected to the electronic device 101 via an interface, the device ID 410 and other associated data of the external device 401 may be sent to the electronic device 101 and be read by the ID sensing part 122. The ID sensing part 122 may obtain information on the type, functionality, coupling direction, and power source of the external device 401 from the device ID 410. On the basis of the information about the external device 401 obtained by the ID sensing part a 122, the processor 120 may at least partially control the electronic device 101 such as by executing a piece of software matching the function of the connected external device 401.

When the external device 401 is electrically connected to the electronic device 101, the electronic device 101 may determine whether the external device 401 has a power source 450. If the external device 401 has a power source such as a battery as shown in FIG. 4B, the power sensing part 124 of the electronic device 101 may measure the battery power of the external device 401. The power controller/comparator 123 of the electronic device 101 may compare the remaining battery power of the electronic device 101 with that of the external device 401, and perform a power control operation under the direction of the processor 120.

In the external device 401, the power sensing part 440 may sense the remaining power of the second power source 450. The power control part 430 may transfer the sensed information to the processor 120 of the electronic device 101.

The power control part 430 of the external device 401 may control supply of power needed for function execution, if necessary.

Figure 4C:
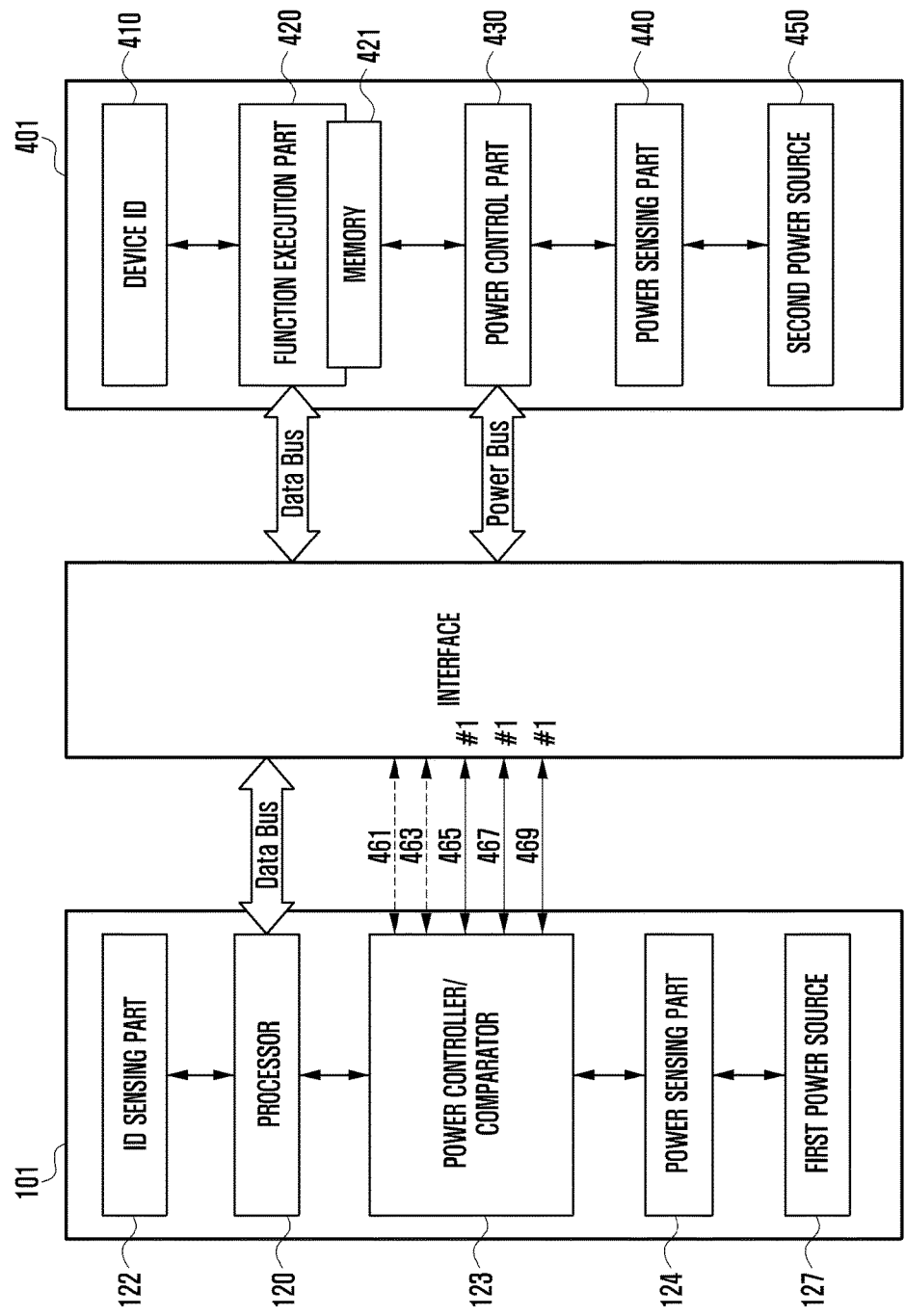
Figure 4D:
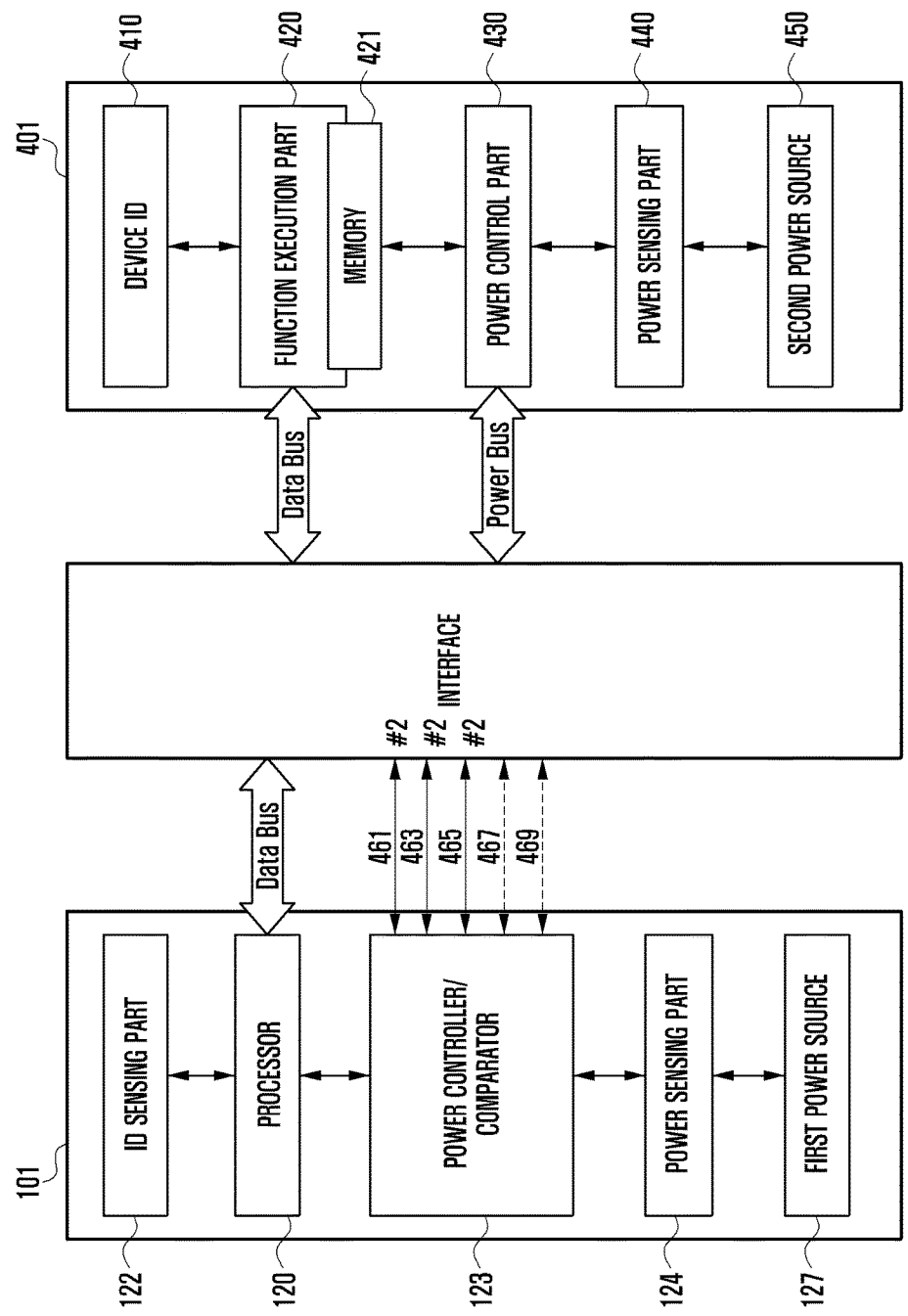

In embodiments, power supply may be varied according to the device ID of the external device as shown in FIG. 4C and FIG. 4D. For example, referring to FIG. 4C, assuming that the external device has a device ID of "#1", the processor 120 may control power supply in association with the external device by activating power lines corresponding to ID "#1" only, such as power lines 465, 467, and 469. As another example, referring to FIG. 4D, assuming that the external device has a device ID of "#2", the processor 120 may control power supply in association with the external device by activating power lines corresponding to ID "#2" only, such as power lines 461, 463, and 465. In other words, the processor 120 may control power supply in connection with an external device on the basis of the device ID of the external device.

In some cases, the power control part 430, power sensing part 440, and second power source 450 may be not included in the external device 401 according to the type of the external device 401.

The following are aspects according to embodiments of the present disclosure:

An electronic device may include a housing including a first face and a second face tending toward the opposite direction of the first face, a coupling member placed on the first face of the housing to removably receive an external device, a first power source arranged in the housing, a power management integrated circuit electrically connected with the first power source, a processor electrically connected with the first power source and the power management integrated circuit, and a memory electrically connected with the processor. The memory may store instructions that, when executed, cause the processor to perform a process of determining whether the external device has a second power source, supplying, when the external device has a second power source, a first level of power from the second power source to the power management integrated circuit, and supplying, when the external device does not have a second power source, a second level of power from the first power source to the power management integrated circuit.

An electronic device may include a housing including a first face and a second face tending toward the opposite direction of the first face, an embedded touchscreen display arranged in a region of the first face, an embedded camera arranged in a region of the second face, a groove placed separately from the embedded camera on the second face of the housing to receive a removable external device so that the removable external device is at least partially exposed, a plurality of contacts placed in the groove that electrically contacts the removable external device, a processor arranged in the housing, and a memory arranged in the housing and electrically connected with the processor. The memory may store instructions that, when executed, cause the processor to perform a process of determining whether a removable external device is installed in the groove, and, when a removable external device is installed in the groove, executing a piece of software for interworking between the camera of the external device and the embedded camera of the electronic device, and outputting a user interface on the touchscreen display to receive user input for controlling camera interworking.

An electronic device may include an interface part that electrically contacts an external device, and a processor to perform a process of determining, when an external device is electrically connected, whether the external device has a second power source, and controlling usage of a first power source of the electronic device according to the result of determination.

An electronic device may include an interface part that electrically contacts an external device, and a processor to perform a process of executing, when an external device is electrically connected, a piece of software associated with the external device, outputting a user interface to receive user input for controlling the external device, and controlling at least one function of the piece of software in association with the external device.

FIGS. 5A, 5B, 6, 7, 8, 9A and 9B illustrate examples of external devices attachable to the electronic device according to embodiments of the present disclosure. External devices attachable to the electronic device may include a camera, speaker, memory, sensor, and payment device. However, the present disclosure is not limited thereto, and other types of external devices may be coupled with the electronic device. The device ID of an external device may differ by the type or model, and power control operation may also be performed differently according to the ID information.

Figure 5A:
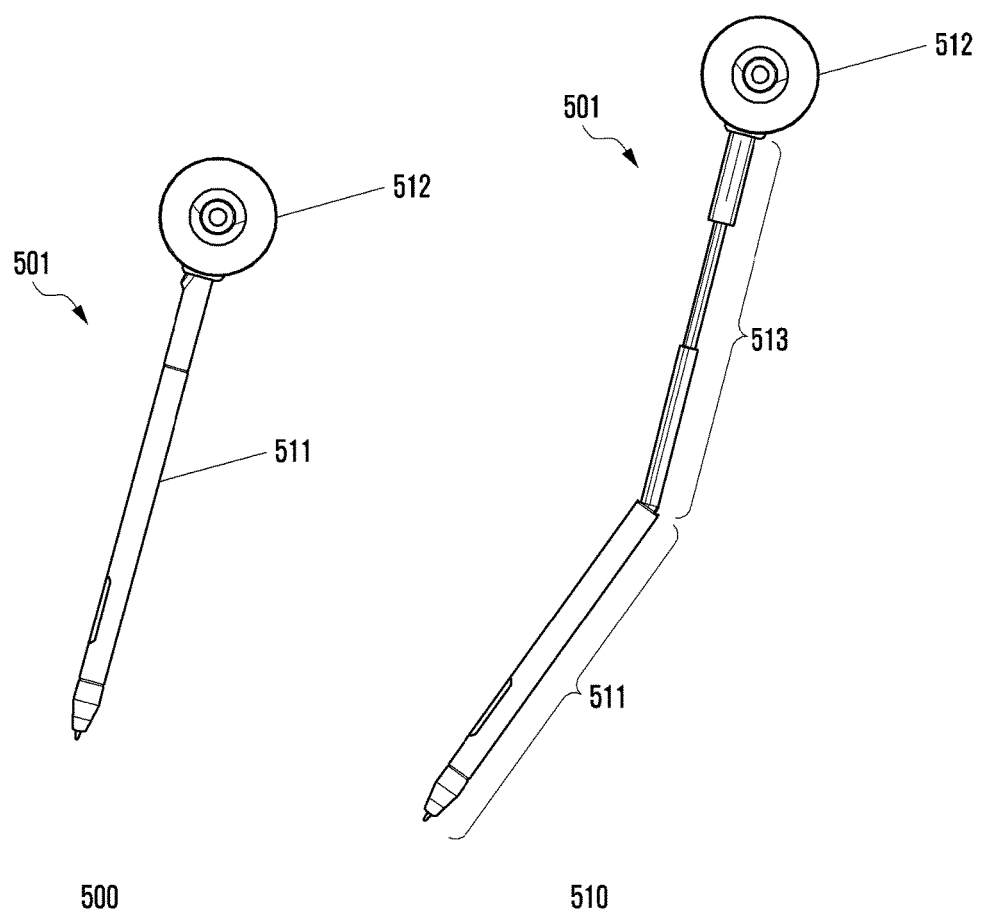
FIGS. 5A and 5B illustrate a pin-shaped external device attachable to the electronic device according to embodiments of the present disclosure.
Figure 5B:
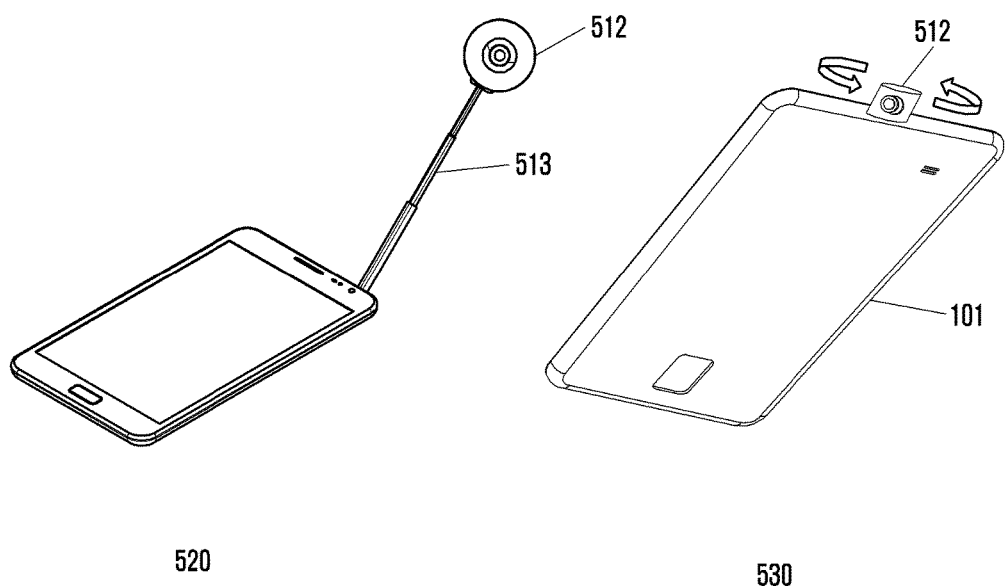

FIGS. 5A and 5B illustrate a pin-shaped external device 501, which can be attached to the electronic device 101 by being inserted into a groove formed on the housing of the electronic device 101. In FIG. 5A, as indicated by 500, the external device 501 may include a body 511 functioning as a touch pen, and a camera 512. For attachment, the pin-shaped external device 501 may be inserted into a touch-pen specific groove by being inserted into a separately designed groove. The groove to which the pin-shaped external device 501 can be attached may be formed at various locations on the electronic device 101.

In FIG. 5A, as indicated by 510, the external device 501 may be configured to include a body 511, a camera 512, and an antenna-shaped member 513 between the body 511 and the camera 512. The body 511 of the external device 501 may be inserted inside the groove of the electronic device 101.

In FIG. 5B, as indicated by 520, the pin-shaped external device 501 can be coupled to a groove formed on one side of the electronic device 101. As shown, the external device 501 may be coupled to the electronic device 101 in such a manner that the antenna-shaped member 513 and the camera 512 are exposed outside the electronic device 101.

In FIG. 5B, as indicated by 530, the external device 501 may be coupled to the electronic device 101 in such a manner that the body 511 of the external device 501 is inserted inside the groove of the electronic device 101 and only the camera 512 is exposed outside the groove. The camera 512 of the external device 501 may be rotated, so that it can serve as a rear-facing camera or a front-facing camera of the electronic device 101.

Figure 6:
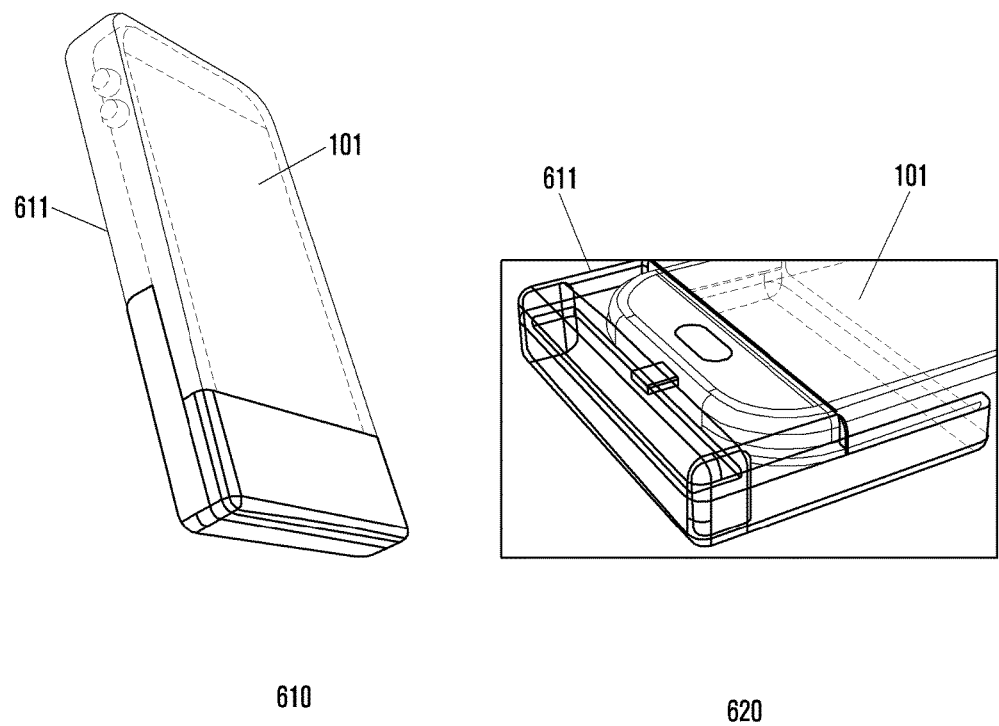
FIG. 6 illustrates an external device that can fit into the exterior of the housing of the electronic device in the form of a cover according to embodiments of the present disclosure.

In FIG. 6, as indicated by 610, the external device 611 can be coupled to the electronic device 101 by covering the exterior of the housing of the electronic device 101. As indicated by 620, the external device 611 may be electrically connected to the electronic device 101 through a connector site used for USB connection.

Figure 7:
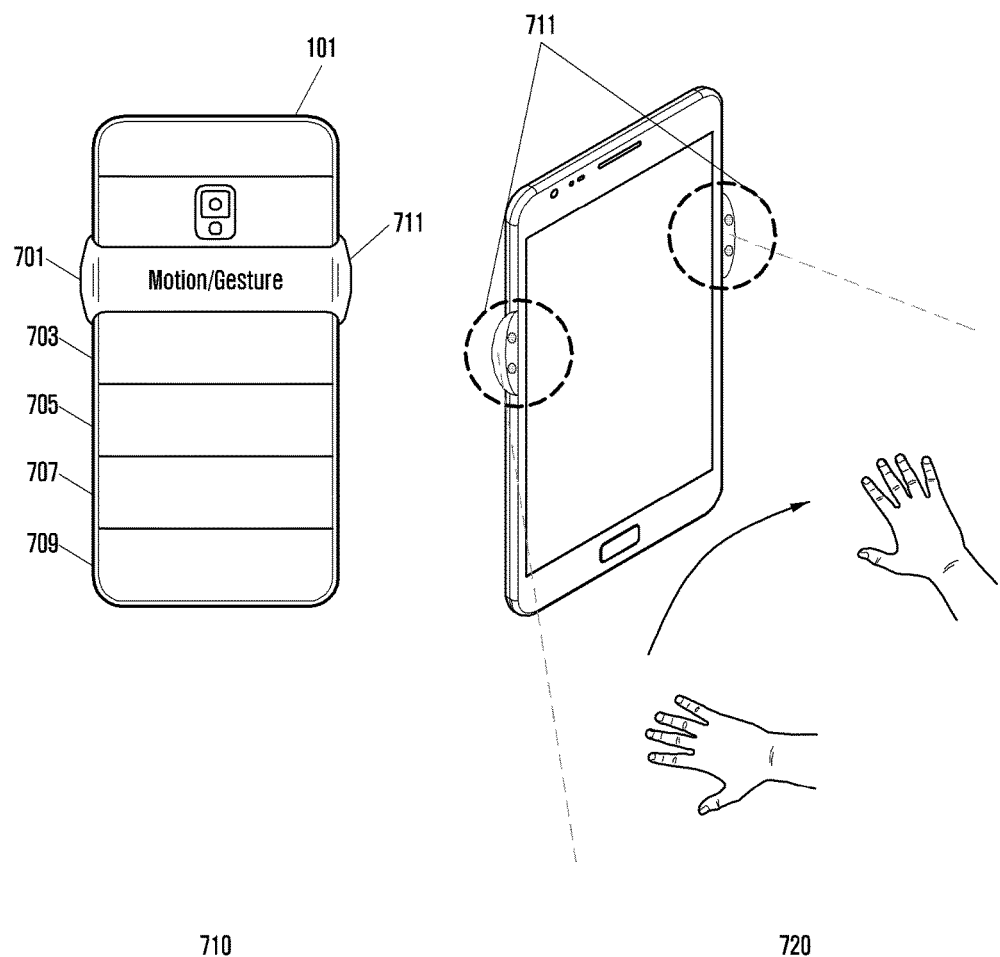
FIG. 7 illustrates an electronic device having an assemblable structure and an external device attached to the electronic device as a component according to embodiments of the present disclosure.

As shown in FIG. 7, the body of the electronic device 101 may be composed of sections 701, 703, 705, 707 and 709, to which an external device of an assemblable module type may be detachably attached. Other types of configurations are also possible. As indicated by 710, an external device 711 of an assemblable module type may be coupled to the body section 701 of the electronic device 101. As indicated by 720, the external device 711 may be a motion recognition module having motion sensors capable of recognizing user motion. Such an external device of an assemblable module type may be assembled with the electronic device 101 in a manner customized according to the user and situations.

In the description of FIG. 7, although a motion recognition module with a motion sensor is described as an external device attached to the electronic device 101, the present disclosure is not limited thereto, and other external devices of an assemblable module type may be attached to the electronic device 101. For example, in addition to a motion recognition module, a camera module, a high-performance speaker module, or an expanded battery module may also be attached to the external device. Specifically, a speaker may be attached to the section 703 and an expanded battery may be attached to the section 705.

Figure 8:
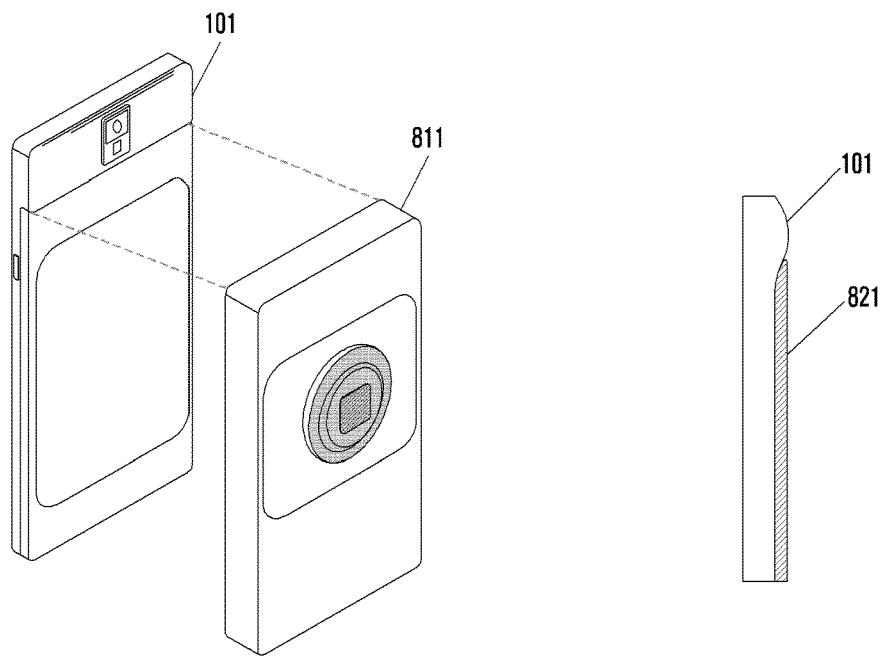
FIG. 8 illustrates an external device having a battery pack shape according to embodiments of the present disclosure.
Figure 8:
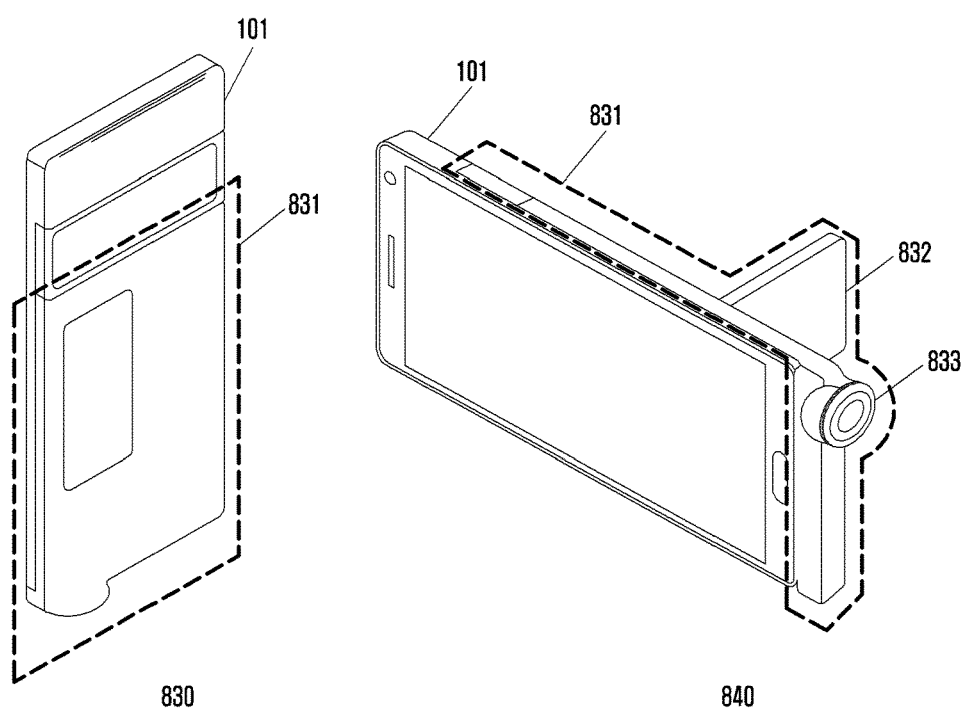

FIG. 8 illustrates a removable external device 811 or 831 having a battery pack shape. As indicated by 810, the external device 811 with a camera function may have a battery pack shape. The external device 811 may be coupled to the electronic device 101 instead of a battery pack given to the electronic device 101.

At 820 is indicated a side view of the electronic device 101 coupled with an external device 821. As indicated by 820, the external device 821 may be coupled to the electronic device 101 by being inserted, instead of a battery pack, in a concave compartment of the electronic device 101 designed to receive a battery pack.

At 830 is indicated another external device 831 having a battery pack shape. The external device 831 may be coupled to the electronic device 101 to thereby provide a camcorder function. As indicated by 840, the external device 831 may include a camera 833 serving as a side-facing camera and a display 832 to display images captured by the camera 833.

Figure 9A:
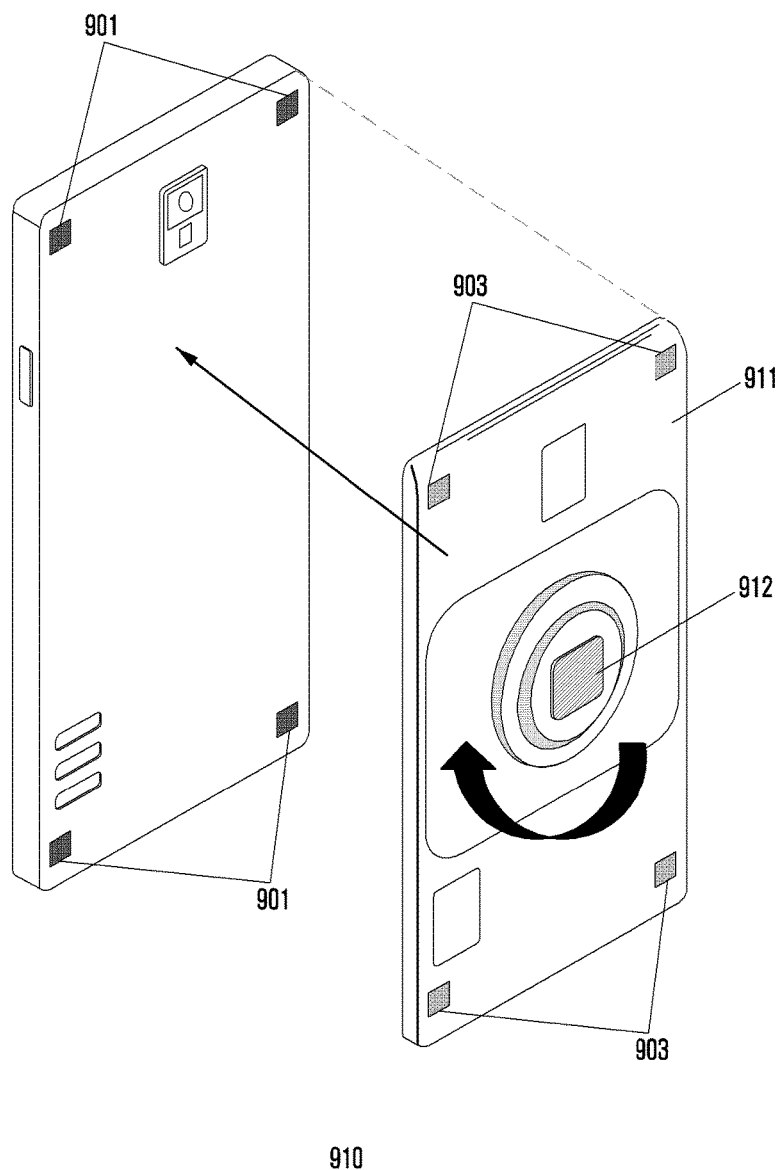
FIGS. 9A and 9B illustrate an external device serving as a cover according to embodiments of the present disclosure.
Figure 9B:
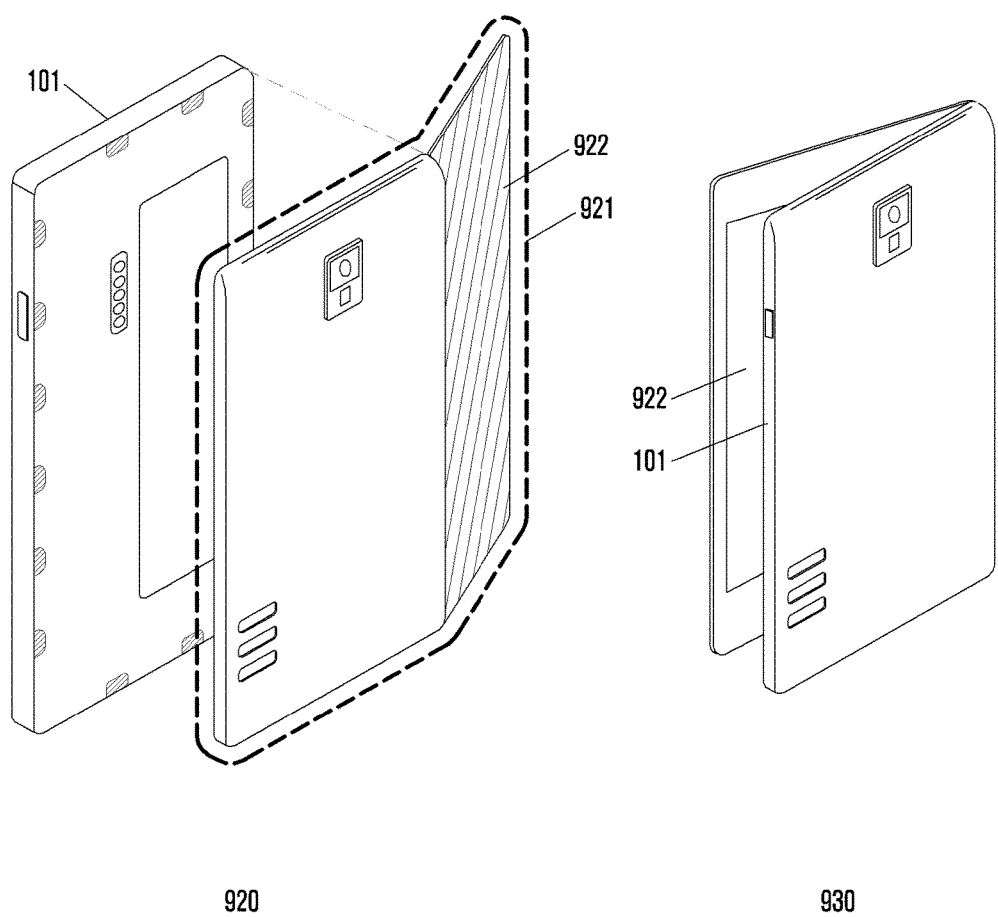

FIGS. 9A and 9B illustrate an external device 911 or 922 that may serve as a cover of the electronic device 101. As indicated by 910, the external device 911 may be coupled to the electronic device 101 by being attached to the exterior surface of the electronic device 101. The external device 911 may be attached to the electronic device 101 using one or more magnetic substances 901 of the electronic device 101 and magnetic substances 903 of the external device 911. After attachment, the external device 911 may serve as a cover of the electronic device 101. The external device 911 may have a camera 912.

In FIG. 9B, 920 indicates another external device 921 that may serve as a cover of the electronic device 101. The external device 921 may include a separate display 922. As indicated by 930, the external device 921 may be coupled to the electronic device 101 so that the display 922 is placed in front of the electronic device 101. In this case, the electronic device 101 may operate in dual display mode, enabling more efficient utilization of the screen. In embodiments, the display 922 may be a transparent display.

Figure 10A:
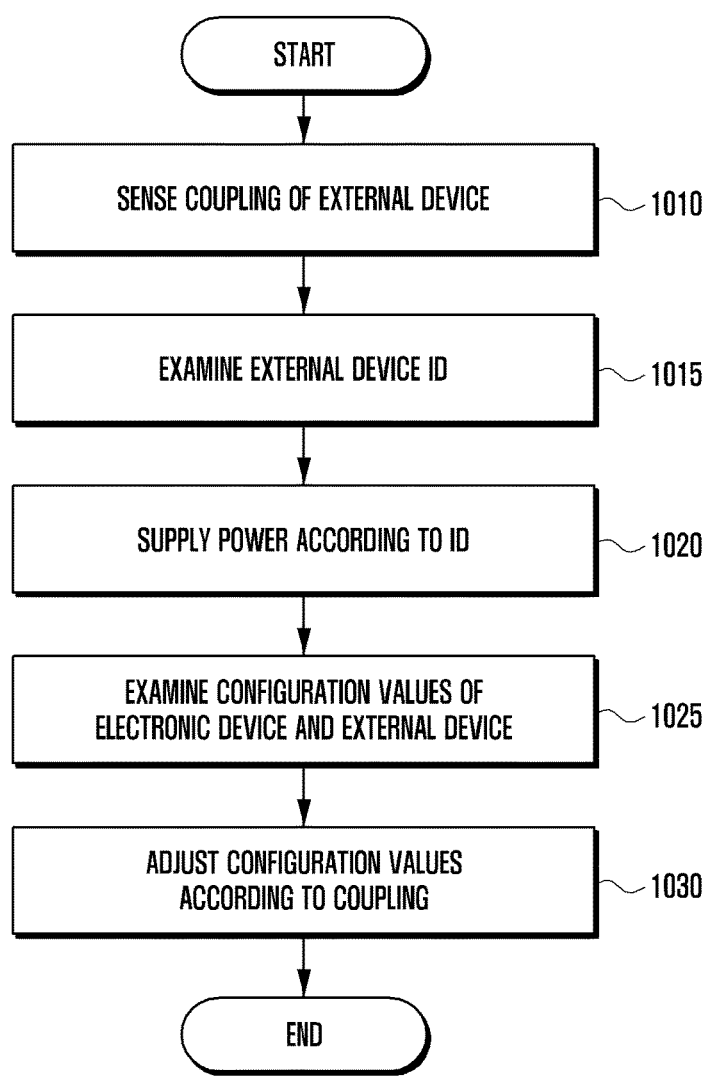
FIGS. 10A and 10B illustrate a procedure for hardware and software actions necessary for coupling between a mobile device and an external device according to embodiments of the present disclosure.
Figure 10B:
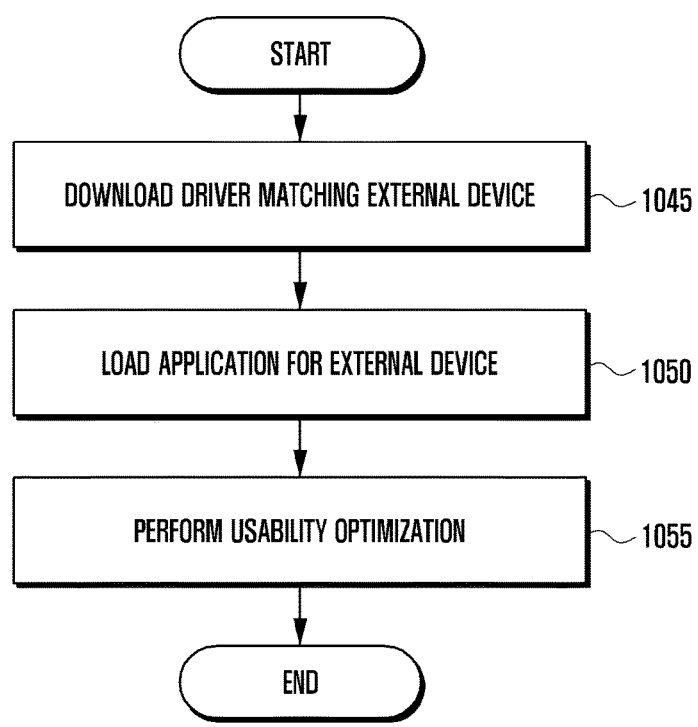

FIGS. 10A and 10B illustrate a procedure for hardware and software actions necessary for coupling between the electronic device 101 and an external device according to embodiments of the present disclosure. FIG. 10A depicts hardware related operations.

At step 1010, the processor 120 of the electronic device 101 determines whether an external device is coupled to the electronic device 101. An external device may be one of those described in FIGS. 5A, 5B, 6, 7, 8, 9A and 9B or be of a different type. An external device may establish a connection to the electronic device 101 through short-range wireless communication such as Bluetooth. An external device may be electrically connected to the electronic device 101 by coupling pins to a connector of the electronic device 101. The electronic device 101 may detect establishment of a wired or wireless connection to such an external device. In embodiments, when an external device is coupled to the electronic device 101, the processor 120 may output a visual notification, such as LED lighting or an audible notification, such as a beep. Through such a visual or audible notification, the user may be aware that an external device is coupled to the electronic device 101.

At step 1015, the processor 120 receives ID information from the external device and examines the ID information. For example, the ID information may include information on the type and power source of the external device. Identification of ID information may be performed by the processor 120 or another module, such as an ID sensing part. In embodiments, the device ID of an external device may be identified through at least one of installation site of the electronic device 101, ID pin power level, a I2C bus communication, interrupt signal, magnetic force level, color code (RGB), and frequency reflection, such as a surface acoustic wave (SAW) filter reflection. A color code may be generated by an external device coupled to the electronic device 101, and may be a six-digit three-byte hexadecimal number for red, green and blue components. To identify the ID information of the external device, the processor 120 of the electronic device 101 may use an RGB sensor to recognize an RGB code generated at the coupling portion of the external device.

On the basis of the received ID information, the processor 120 may determine presence of a power source or battery in the external device and identify functionality of the external device.

At step 1020, the processor 120 sets up a power supply configuration on the basis of analysis of the ID information, such as based on drawing a VBAT-level voltage from the external device, voltage level conversion, charge level of the electronic device 101, utilization of the external device by the user, and power distribution between the electronic device 101 and the external device. In the case of failure in recognition of ID information of the external device, the processor 120 may download ID information of the external device from the Web. Specifically, step 1020 may be related to connection of a bus corresponding to the external device ID and initialization of the bus in the processor 120. For example, an interface bus (I/F bus) suitable for the external device may be determined or a universal interface may be formed. In embodiments, the processor 120 may check firmware or driver update through the bus corresponding to the external device ID.

Thereafter, at step 1025, the processor 120 examines configuration values of the electronic device 101 and the external device. For example, the configuration values may be related to the functionality of the external device and the installation site of the external device among multiple candidate coupling sites.

At step 1030, the processor 120 adjusts the configuration values for coupling between the electronic device 101 and the external device, such as according to magnetic or metallic noise from the electronic device 101, and according to a variation in antenna or speaker performance due to attachment of the external device.

FIG. 10B depicts software related operations for coupling between the electronic device 101 and the external device.

Operations in FIG. 10B are not independent of operations in FIG. 10A, and may be executed together with or additionally to the operations in FIG. 10A.

At step 1045, the processor 120 downloads a driver matching the attached external device. When a driver matching the external device is already present in the electronic device 101, step 1045 may be skipped.

At step 1050, the processor 120 automatically loads an application associated a with the external device. Such an application may be already loaded on the electronic device 101. At step 1050, the processor 120 executes the application so as to optimize usability of the external device.

In embodiments, for usability optimization, when the external device is a camera, the processor 120 of the electronic device 101 may detect attachment of the external camera, and may execute an application corresponding to the external camera. During execution of the application, the processor 120 may measure and adjust the installation site of the external camera, control parameters of the illuminance sensor or gyro sensor, identify depth information of the external camera and the camera of the electronic device 101 for three dimensional (3D) or high dynamic range (HDR) images, and correct radial distortions for a fisheye lens.

In one embodiment, when an external device (i.e. camera) is attached to the electronic device 101 having a camera, the external camera may be used first, such as when the performance of the external camera is superior to that of the camera of the electronic device 101. In this case, the processor 120 may turn off the camera of the electronic device 101 and may use only the camera-related function of the electronic device 101. For example, the processor 120 may store images by use of information on the location, sound, altitude, and scent received through the sensor module of the electronic device 101, and may perform phase detection autofocus and high dynamic range imaging by use of the companion IC of the electronic device 101.

In addition, when the external device is a night vision camera, the processor 120 may determine whether to execute an image correction application according to the level of illumination sensed by the illuminance sensor. When the external device is a special-purpose camera, the processor 120 may invoke a corresponding application specific to the camera and adjust setting values for microscopic, high-resolution, 360-degree imaging, or 3D depth operation.

In embodiments, when the external device is a speaker, the processor 120 of the electronic device 101 may detect attachment of the external speaker and may execute an application corresponding to the external speaker, such as display a volume control menu. In response to attachment of the external speaker, the processor 120 may automatically identify the attachment site, which may not be fixed in the case of an electronic device having an assemblable structure, and automatically configure settings for stereo or 3D sound effects.

When the performance of the external speaker is superior to that of the speaker of the electronic device 101, the processor 120 may turn off the speaker of the electronic device 101, or may reproduce a sound material in a lossless manner through digital-to-analog conversion (DAC) and a codec.

In embodiments, when the external device is a storage device, in response to attachment of the external storage device, the processor 120 may automatically execute a corresponding application such as a file browser, and may automatically receive fingerprint information or the like for identity verification to be performed when a file is stored in or is retrieved from the external storage device. For private files, the processor 120 may block network access while the external storage device is accessed.

When images are stored in the external storage device, it is possible to cure the time limit problem arising when a high pixel-count ultra high definition (UHD) video is captured. In one embodiment, before storing an image in the external storage device, the processor 120 may temporarily store the image in the buffer memory of the electronic device 101, which enables the processor 120 to cure a problem that may arise when the external device is accidentally detached from the electronic device 101. The processor 120 may automatically receive fingerprint information or the like for identity verification to be performed when a file is stored in or is retrieved from the external storage device. For private files, the processor 120 may block network access while the external storage device is accessed.

When reproducible sound materials are stored in the external storage device, the processor 120 may store sound material as a private file through identity protection based on fingerprints and network access blocking.

When the external device is a battery, the processor 120 may add an icon indicating the battery charge level, and may first charge the electronic device 101 and then charge the external battery.

A more detailed description is given of usability optimization with reference to FIGS. 11A, 11B, 12A, 12B and 12C.

Figure 11A:
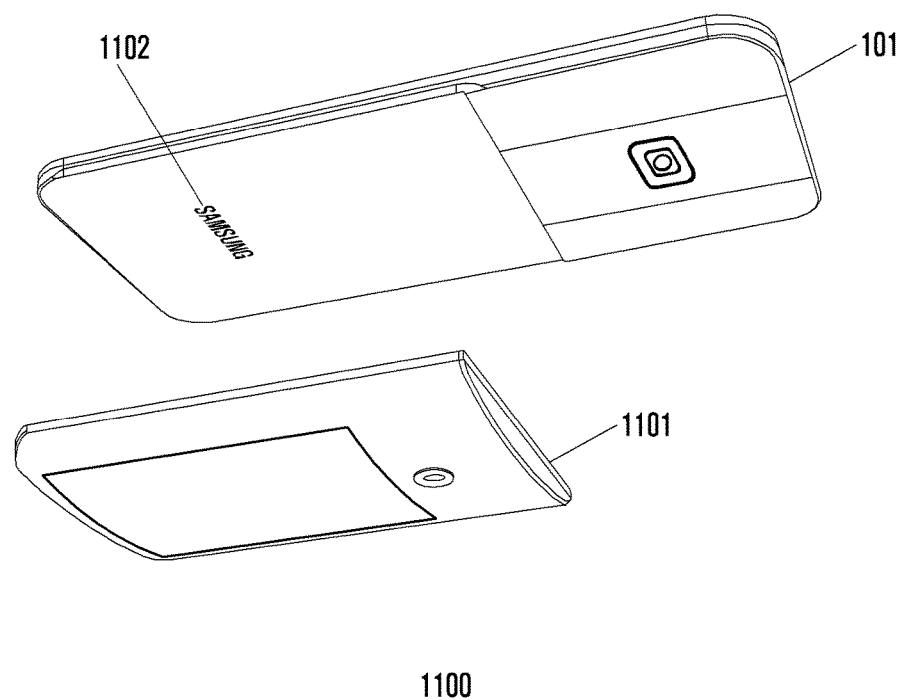
FIGS. 11A and 11B illustrate a mobile device and an external device having a battery pack shape according to embodiments of the present disclosure.
Figure 11B:
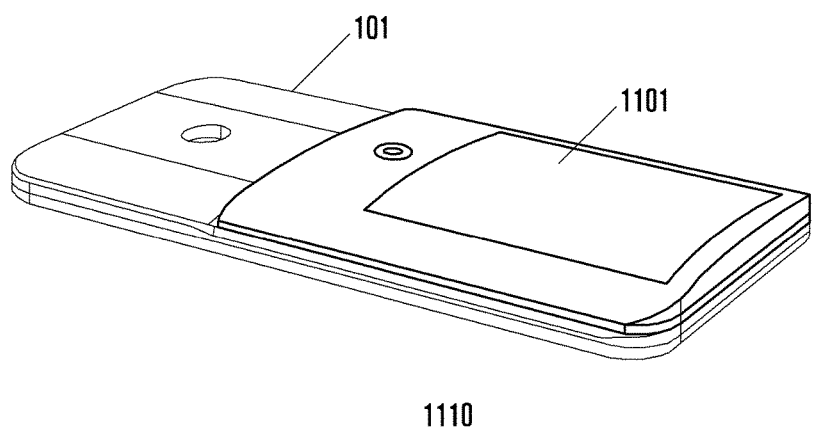
Figure 11B:
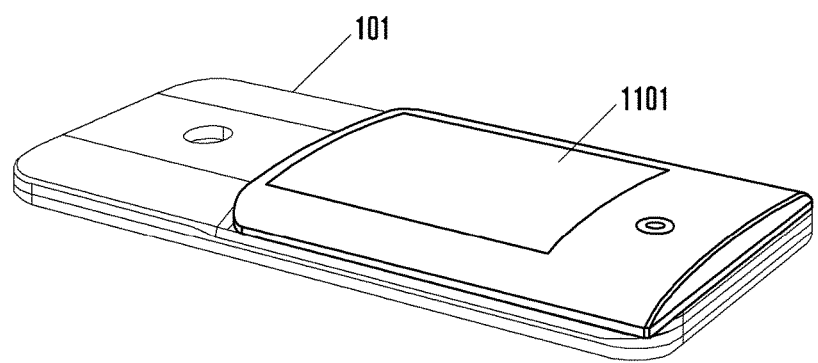

FIG. 11 illustrates an external device 1101 that can be coupled to the electronic device 101 in the form of a battery pack. The external device 1101 may be coupled to the electronic device 101 by means of a special connector such as a pogo-pin connector 1102. In addition to pogo pins, the special connector may include other types of connecting terminals. The pogo-pin connector 1102 may be configured to have a shape of a specific character string such as a manufacturer's logo.

In embodiments, the external device 1101 may be designed to be coupled to the electronic device 101 in a specific direction, such as forward direction, as indicated by 1110 in FIG. 11A, or in the reverse direction, as indicated by 1120 in FIG. 11B. The pogo-pin connector 1102 may be designed to distinguish whether the external device 1101 is coupled to the electronic device 101 in the forward direction or in the reverse direction.

Figure 12A:
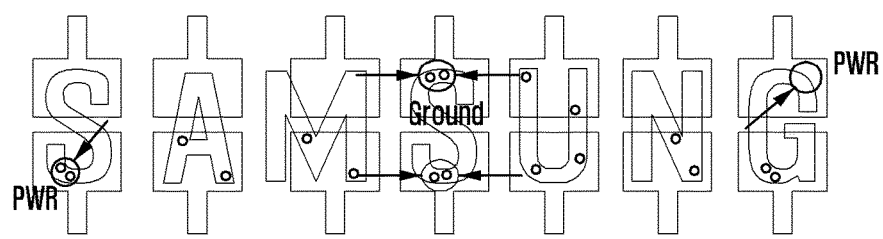
FIGS. 12A, 12B and 12C illustrate a coupling structure based on pogo-pin connectors for connecting an external device to the mobile device according to embodiments of the present disclosure.
Figure 12B:
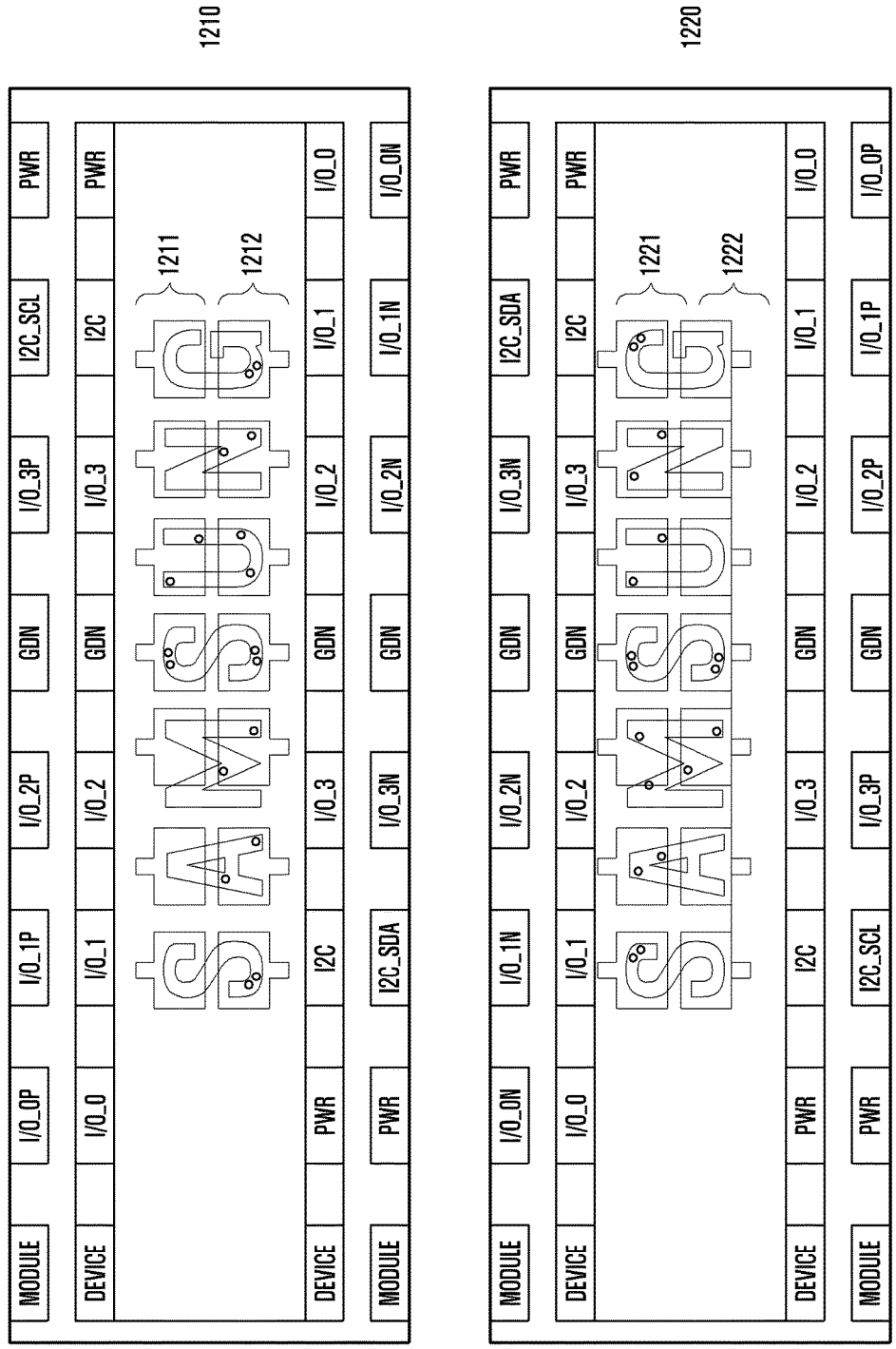
Figure 12C:
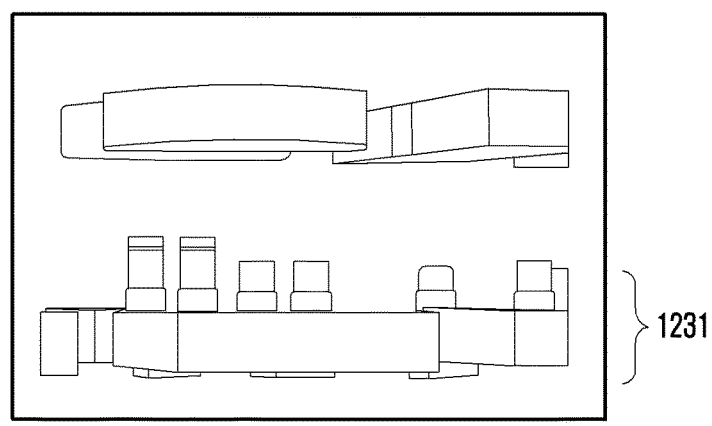
Figure 12C:
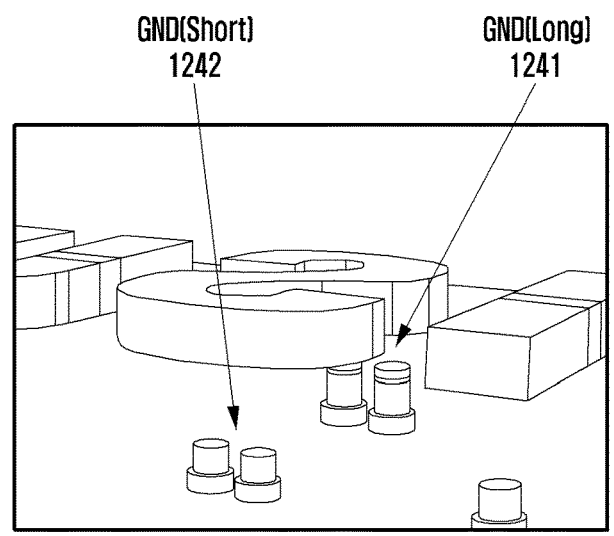

FIGS. 12A, 12B and 12C illustrate the pogo-pin connector 1102. In FIG. 12A, as indicated by 1200, the pogo-pin connector 1102 may be formed in a shape of a string of English letters representing a logo of the manufacturer. The terminals at the first element among the elements corresponding to the letters may be connected to power, and the terminals at the middle element may be connected to ground.

In FIG. 12B, 1210 indicates the connector configuration when the external device 1101 is coupled to the electronic device 101 in the forward direction. 1220 indicates the connector configuration when the external device 1101 is coupled to the electronic device 101 in the reverse direction. A comparison between the connector configuration 1210 and the connector configuration 1220 may reveal that the direction of terminals of the electronic device is the same and the direction of terminals of the external device is rotated 180 degrees. In a connection structure allowing both forward direction coupling and reverse direction coupling, it is possible to design the pins connectable to each letter-shaped element so that they may be coupled in both the forward and reverse directions. Pins of the terminals to be grounded may be configured to have different lengths, distinguishing between forward direction coupling and reverse direction coupling. Terminals connected to upper ends of the letter-shaped elements in forward direction coupling 1210 as indicated by 1211, may be connected to lower ends of the letter-shaped elements in reverse direction coupling 1220 as indicated by 1222. Inversely, terminals connected to lower ends of the letter-shaped elements in forward direction coupling, as indicated by 1212, may be connected to upper ends of the letter-shaped elements in reverse direction coupling, as indicated by 1221.

In FIG. 12C, the upper end of the drawing 1230 indicates the connector part of the electronic device 101 and the lower end thereof indicates the connector part 1231 of the external device to be coupled with the electronic device 101. As shown, ground pins with different lengths 1241, 1242 may be installed at terminals of the external device as indicated by 1240. The electronic device 101 may identify the direction of coupling (forward or reverse) by checking the upper/lower contact order of the ground pins.

For signal connection stability, the external device 1101 may be configured to use two or more pogo pins for each signal contact, such as a one letter-shaped element with the electronic device 101.

Hereinabove, a description is given of external devices that can be coupled to the electronic device 101 in various manners. In addition to the schemes described above, an external device may be connected to the electronic device 101 through wireless communication based on the mmWave band. Specifically, when the electronic device 101 and the external device may each have a wireless communication IC for close proximity (about 10 cm), the electronic device 101 may identify the ID of the external device and communicate data with the external device by use of close proximity wireless communication.

In embodiments, when an external device is coupled to the electronic device 101, it is possible to control the electronic device 101 (or external device) so that they can operate smoothly according to the coupling state. For example, the electronic device 101 may perform different functions or operations according to whether the external device is coupled in the forward direction or in the reverse direction.

Next, a description is given of examples where different functions are executed according to the state or condition of coupling between the electronic device and the external device with reference to FIGS. 13A, 13B, 13C and 13D.

FIGS. 13A, 13B, 13C and 13D illustrate usage of the mobile device 101 coupled with a camera-equipped external device according to the coupling states.

Figure 13A:
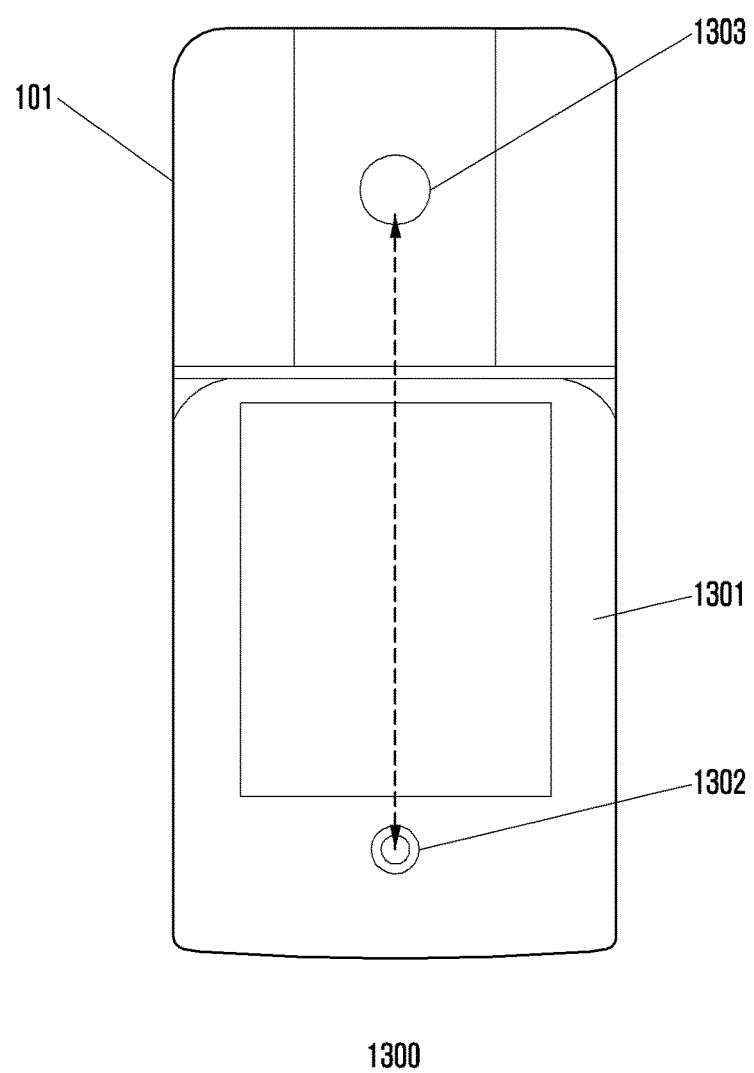
FIGS. 13A, 13B, 13C and 13D illustrate usage of a mobile device coupled with a camera-equipped external device conforming to coupling states according to embodiments of the present disclosure.

In FIG. 13A, an external device 1301 is coupled to the electronic device 101 and the distance between the camera 1302 of the external device 1301 and the camera 1303 of the electronic device 101 is maximized. That is, when the external device 1301 is coupled to the electronic device 101 in the reverse direction so that the distance between the cameras 1302 and 1303 is maximized, the electronic device 101 may execute a camera application in 3D shooting mode, and may automatically execute a function capable of utilizing the difference between viewpoints of the cameras.

Figure 13B:
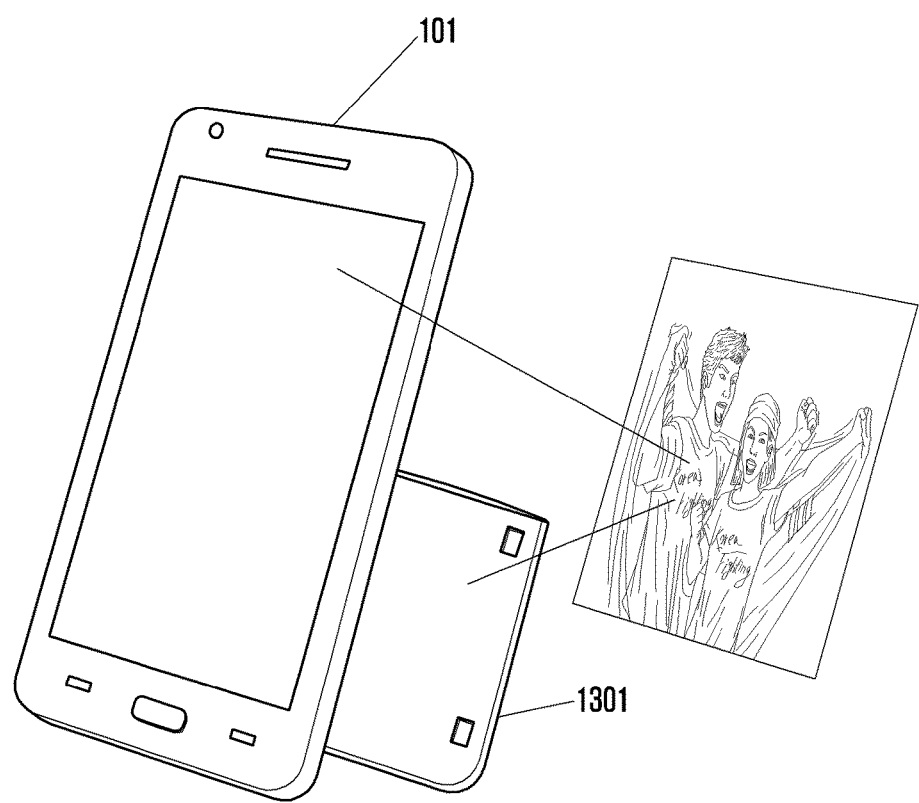
Figure 13C:
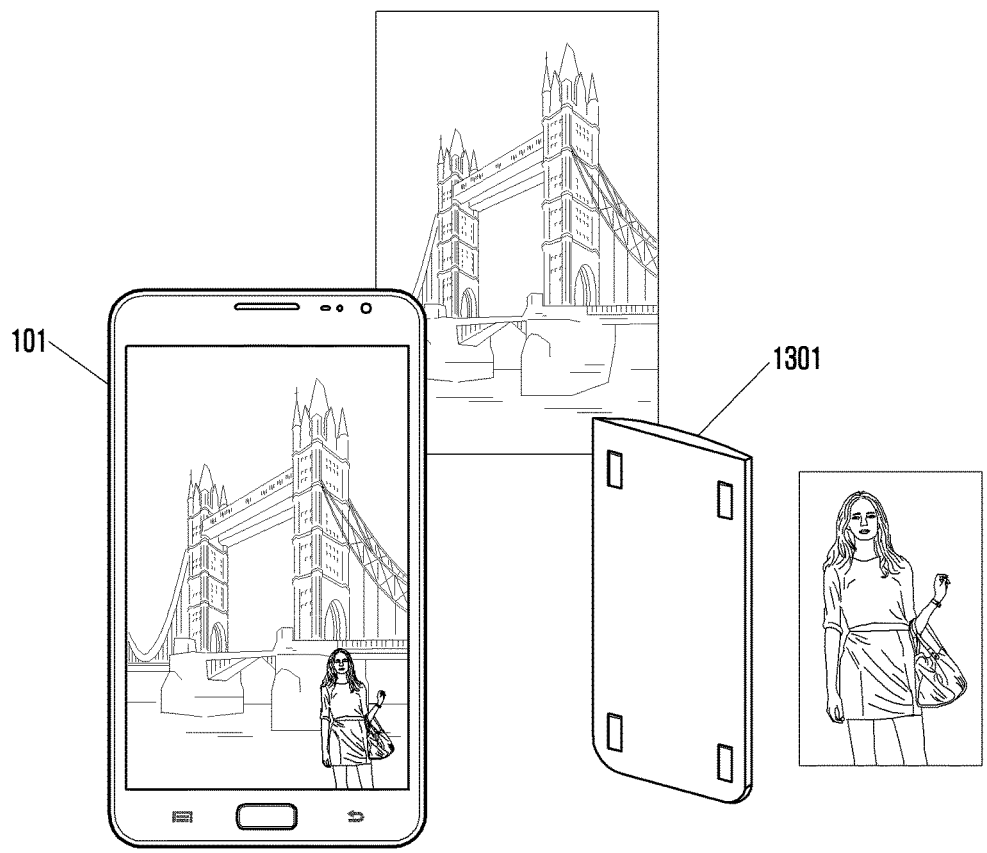

In FIGS. 13B and 13C, the external device 1301 and the electronic device 101 are separated but are connected together via wireless communication. As shown in FIG. 13B, the electronic device 101 may capture an enlarged image while the external device 1301 is brought close to the target object. As shown in FIG. 13C, the electronic device 101 in 1320 may combine images of different target objects captured by the cameras of the electronic device 101 and the external device 1301.

Figure 13D:
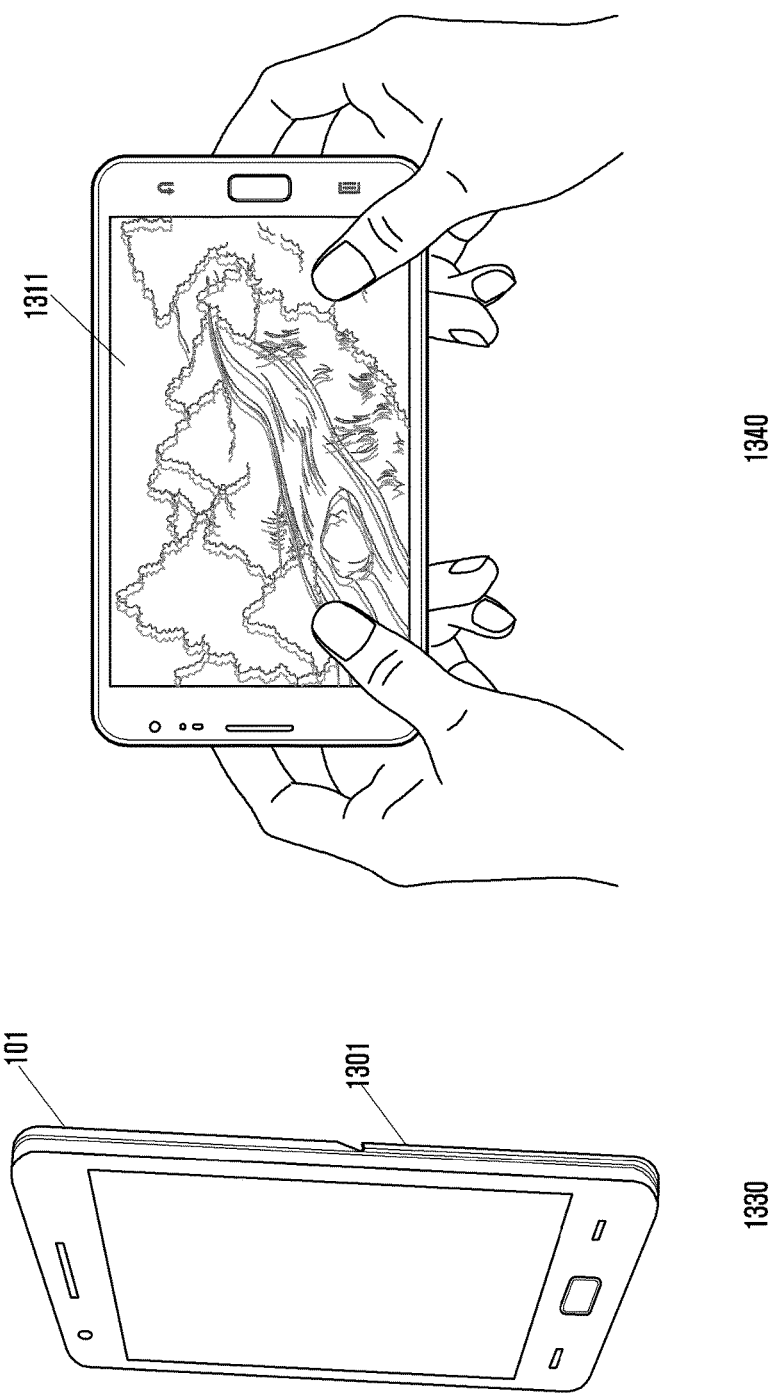

In FIG. 13D, the external device 1301 is coupled to the electronic device 101 in 1330, and the processor 120 may execute an application associated with interworking between the camera of the external device 1301 and the camera of the electronic device 101. In 1340, the processor 120 may display a user interface for the application, receive user input through the user interface, and control the function of interworking between the camera of the external device 1301 and the camera of the electronic device 101. For example, the processor 120 may capture a 3D image in response to user input through the user interface.

In embodiments, when an external device is installed, the electronic device may display a user interface related to a function of the external device. For example, when an external device whose primary function is a camera function is installed, the electronic device may automatically execute a software application for interworking between the cameras of the external device and the electronic device. The electronic device may also output a user interface on the display to receive user input for controlling camera interworking. For instance, when the external camera has a filtering function not provided by the camera of the electronic device, the electronic device may output a list of filters on the screen and apply a filter selected by the user from the list of filters of the external device.

The above software application may autonomously recognize the installation position of the external camera without occurrence of a user input and enter into the mode corresponding to the distance between the external camera and the camera of the electronic device. For example, when the external device having a camera is decoupled from the electronic device, the software application may switch the camera-shooting mode from dual camera mode or 3D shooting mode to enlarged shooting mode.

Figure 14:
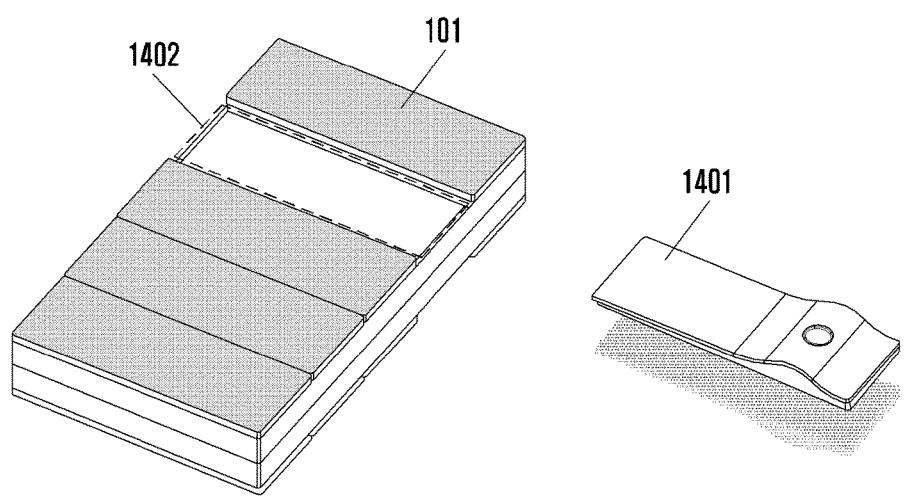
FIG. 14 illustrates an electronic device having an assemblable structure and an external device attached to the electronic device as a component according to embodiments of the present disclosure.
Figure 14:
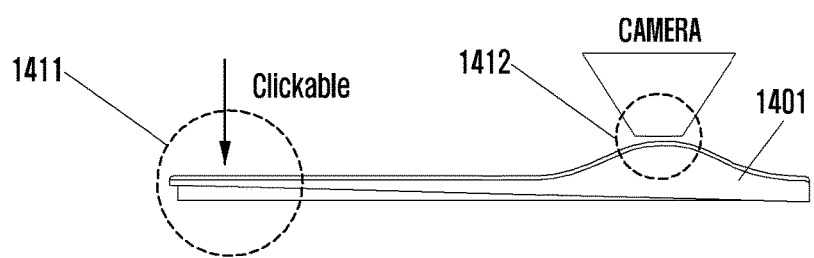

FIG. 14 illustrates the electronic device 101 and individual components installable in the electronic device 101. As indicated by 1400, the electronic device 101 may be configured to have an assemblable structure, and the external device 1401 may be one of the components installable in the electronic device 101. The external device 1401, which may be a camera, speaker, or lighting device, for example, may be inserted in a compartment 1402 of the electronic device 101 to which a component 1402 is coupled. The compartment 1402 may be provided at various locations on the electronic device 101.

As shown in FIG. 14, the external device 1401 of a modular type may include a camera and a clickable button. A 1410 is indicated a side view of the external device 1401, which may include a camera 1412 and a clickable button 1411. When the external device 1401 is coupled to the electronic device 101, the electronic device 101 may automatically perform a function such as camera shooting or data upload (immediate service mode) in response to clicking of the button 1411. The camera of the external device 1401 may also support infrared imaging or high zooming, and the electronic device 101 may execute a suitable application and change menu settings according to the selected camera function.

Other external devices may be coupled to the electronic device in various manners. Such external devices may have various functions related to not only camera and speaker but also health management and electronic payment.

In embodiments, when an external device is coupled to the electronic device 101, the processor 120 of the electronic device 101 may control functions in accordance with the external device. In particular, the electronic device 101 may control the power supply function in accordance with coupling of the external device. For example, when the external device includes a battery as a power source, the electronic device 101 may selectively use one of the battery thereof and the battery of the external device.

Figure 15:
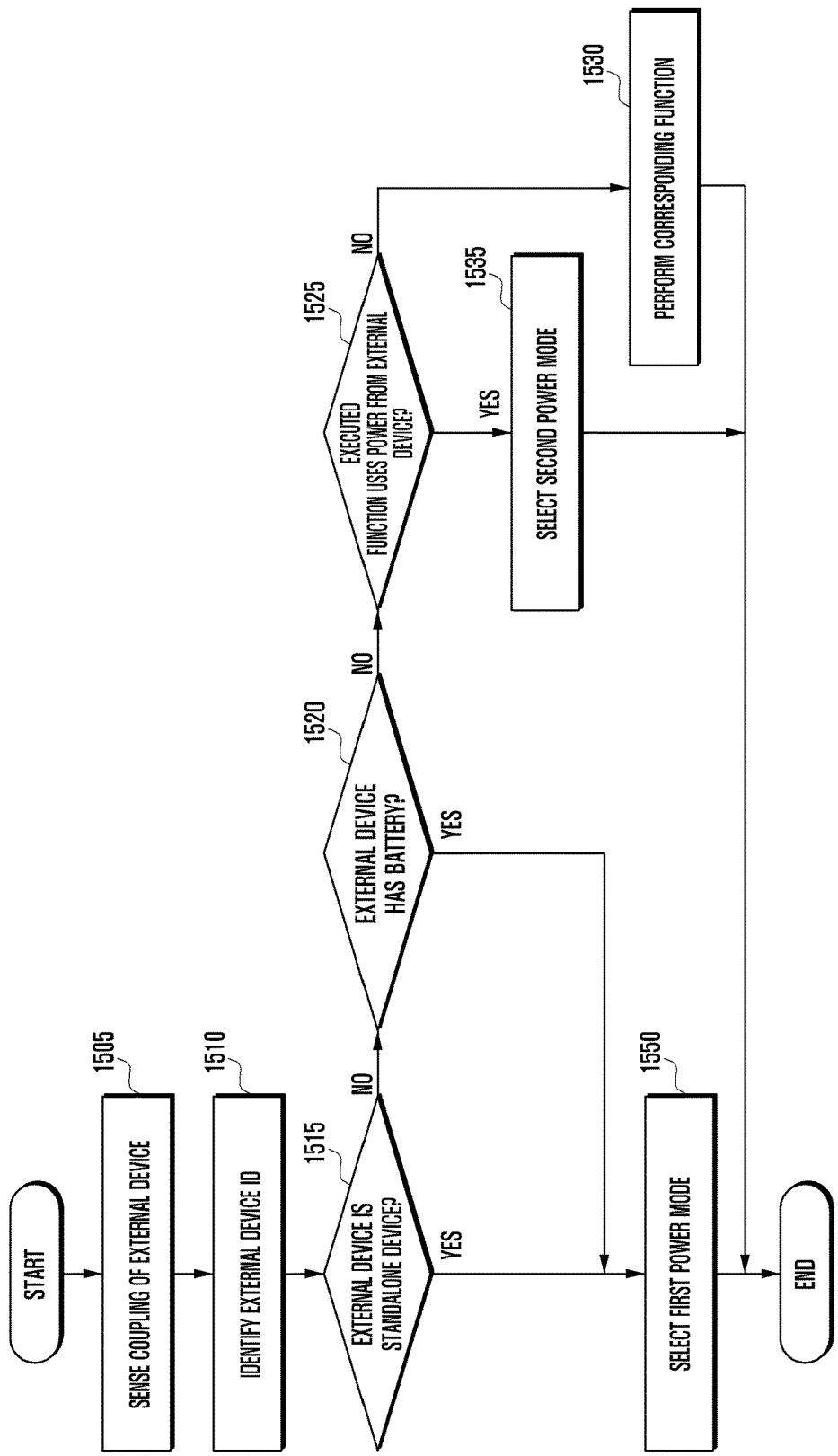
FIG. 15 illustrates a procedure for power mode selection according to embodiments of the present disclosure.

FIG. 15 illustrates a procedure for power mode selection according to embodiments of the present disclosure.

Referring to FIG. 15, at step 1505, the processor 120 of the electronic device 101 detects coupling of an external device. An external device may be attached to the electronic device 101 through not only wired coupling but also wireless coupling based on wireless communication.

Upon detection of coupling, at step 1510, the processor 120 identifies the ID of the external device, which may be sent to the electronic device 101 and is analyzed by the processor 120. The external device may store its device ID information in an internal storage, and the device ID information may include information on the functionality, model, and battery of the external device.

At step 1515, the processor 120 determines whether the external device is a standalone device, such as a device that can operate autonomously and may include an embedded power source such as a battery.

Upon determining that the external device is a stand alone device, at step 1550, the processor 120 selects a first power mode, which is used when the coupled external device is a battery-equipped device (not an external battery module).

Based on whether the external device is a standalone device (or includes a separate battery), one of the batteries of the external device and the electronic device 101 may be selectively used or both batteries may be used in aggregate.

Upon determining that the external device is not a stand-alone device, at step 1520, the processor 120 determines whether the external device includes a battery. When the external device includes a battery, at step 1550, the processor 120 selects the first power mode.

When the external device does not include a battery, at step 1525, the processor 120 determines whether the external device performs a function using power. When the external device does not perform a function using power, at step 1530, the processor 120 may perform a requested operation. For example, step 1530 may be performed when the external device serves as a lens or cover not requiring power supply. In this case, the processor 120 may perform a function using the external device without power control operation.

When the external device performs a function using power, at step 1535, the processor 120 selects second power mode. In the second power mode, the power source, such as the battery of the electronic device 101 may be used for operation. In embodiments, the second power mode may correspond to low-power mode or power-saving mode.

Figure 16:
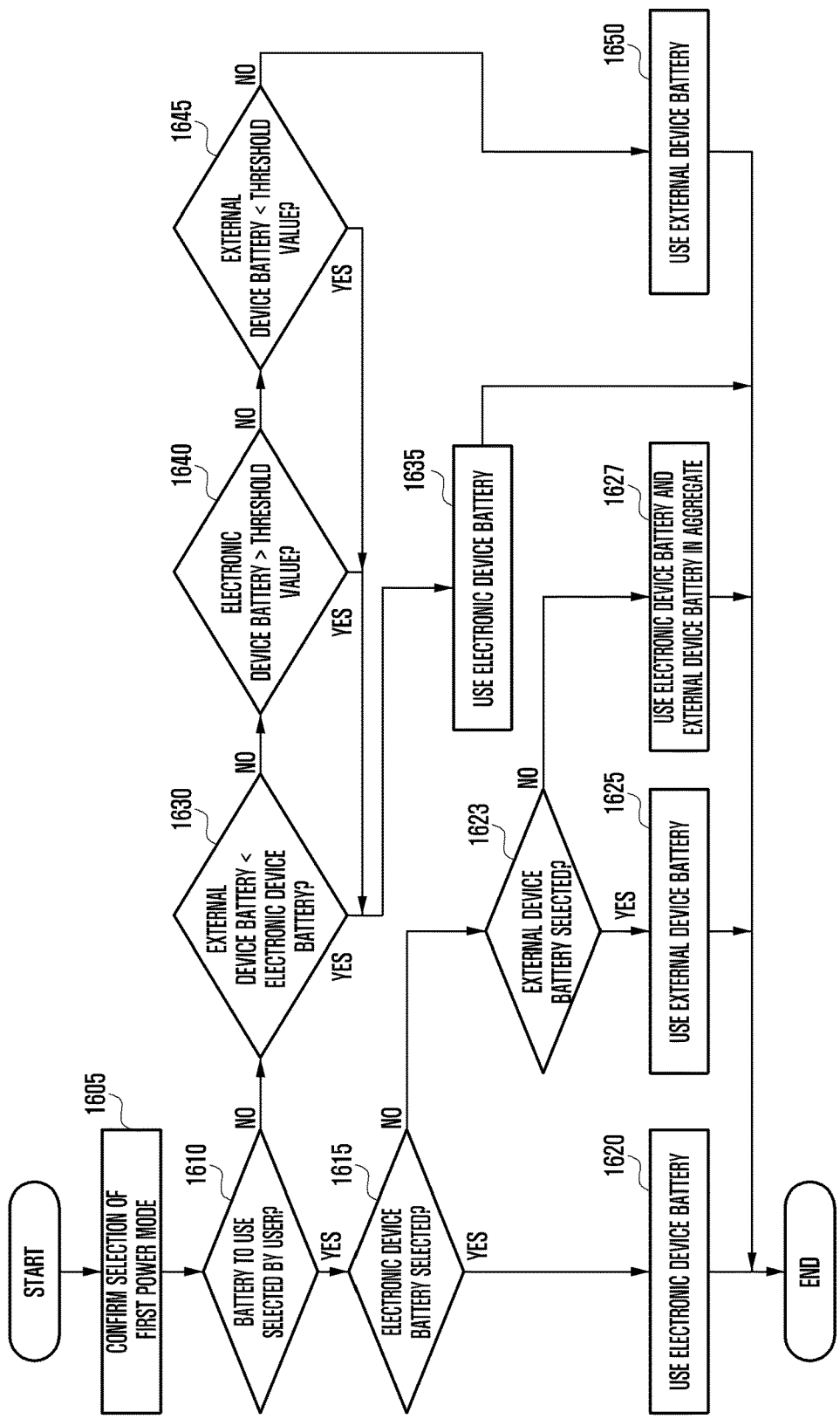
FIG. 16 illustrates a procedure for first power mode according to embodiments of the present disclosure.

FIG. 16 describes a power control procedure for the first power mode according to embodiments of the present disclosure. At step 1605, the processor 120 of the electronic device 101 confirms selection of the first power mode. At step 1610, the processor 120 determines whether the battery to be used is selected by the user. If the battery to be used is selected by the user, at step 1615, the processor 120 determines whether the battery to be used is the battery of the electronic device 101. If the battery to be used is the battery of the electronic device 101, at step 1620, the processor 120 determines to use the battery of the electronic device 101 as a driving battery. If the battery to be used is not the battery of the electronic device 101, at step 1623, the processor 120 determines whether the battery to be used is the battery of the external device. If the battery to be used is the battery of the external device, at step 1625, the processor 120 determines to use the battery of the external device as a driving battery. If the battery to be used is not the battery of the external device, at step 1627, the processor 120 determines to use the batteries of the electronic device 101 and the external device in aggregation.

A description is given of using the batteries of the electronic device and the external device in aggregation with reference to FIG. 4B. The electronic device 101 may recognize that the external device 401 includes a battery by means of device ID examination. The power sensing part 124, such as a battery gauge or thermistor of the electronic device 101 may examine the battery information, such as voltage or capacity of the external device 401. To use the batteries of the electronic device 101 and the external device 401 in aggregation, it is possible to sum up the battery information of the external device 401 and the battery information of the electronic device 101.

Alternatively, the power sensing part 400 of the external device 401 may measure the battery information of the external device 401, and send the measured battery information to the processor 120 or power controller/comparator 123 of the electronic device 101. The processor 120 of the electronic device 101 may sum up the battery information received from the external device 401 and the battery information of the electronic device 101.

Referring back to FIG. 16, if the battery to be used is not selected by the user at step 1610, at step 1630, the processor 120 determines whether the remaining battery power of the external device is less than that of the electronic device 101. In embodiments, the electronic device 101 and the external device may each include a power sensing part capable of sensing the remaining battery power. The external device may automatically send information on the remaining battery power measured by the power sensing part to the electronic device 101 immediately after being coupled to the electronic device 101.

If the remaining battery power of the external device is less than that of the electronic device 101, at step 1635, the processor 120 determines to use the battery of the electronic device 101. If the remaining battery power of the external device is greater than or equal to that of the electronic device 101, at step 1640, the processor 120 determines whether the remaining battery power of the electronic device 101 is greater than a preset threshold. If the remaining battery power of the electronic device 101 is greater than the preset threshold, at step 1635, the processor 120 determines to use the battery of the electronic device 101. If the remaining battery power of the electronic device 101 is less than or equal to the preset threshold, at step 1645, the processor 120 determines whether the remaining battery power of the external device is less than or equal to the preset threshold. If the remaining battery power of the external device is greater than the preset threshold, at step 1650, the processor 120 determines to use the battery of the external device. If the remaining battery power of the external device is less than or equal to the preset threshold, at step 1635, the processor 120 determines to use the battery of the electronic device 101.

In the first power mode, the battery of the external device may be used only when the remaining battery power of the external device is greater than that of the electronic device 101, the remaining battery power of the electronic device 101 is less than or equal to the threshold, and the remaining battery power of the external device is greater than the threshold.

As described above, the electronic device coupled with a battery-equipped external device may select the battery to be used according to the first power mode. However, the present disclosure is not limited thereto, and both the battery of the electronic device and the battery of the external device may be used in aggregation.

Figure 17:
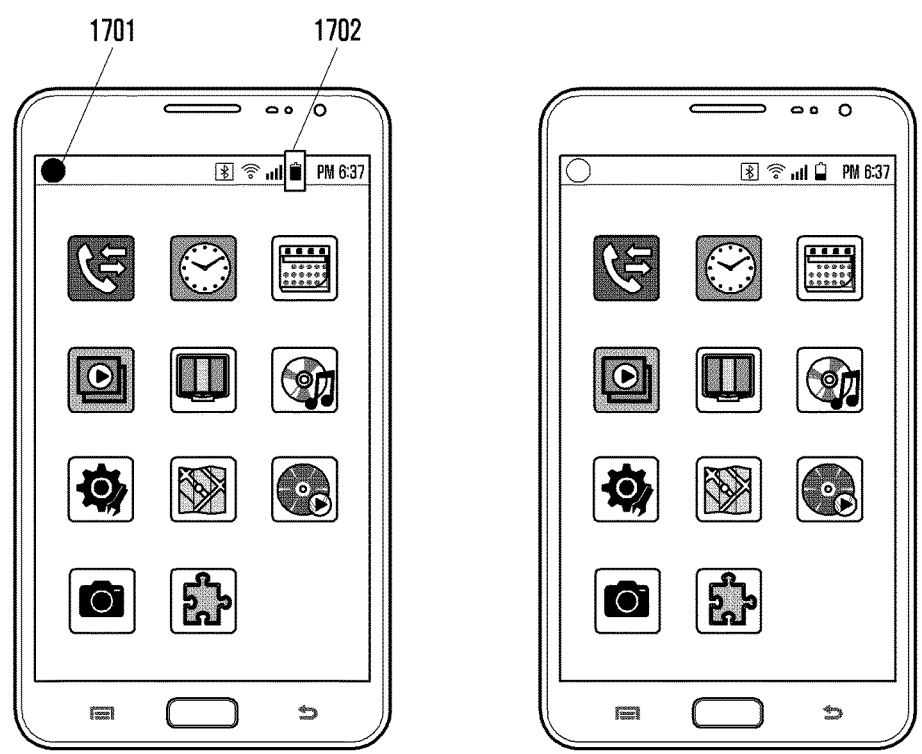
FIG. 17 illustrates display of the remaining battery power in aggregate according to embodiments of the present disclosure.

FIG. 17 illustrates utilization of the battery of the electronic device and the battery of the external device in aggregation according to embodiments of the present disclosure.

In FIG. 17, 1700 indicates a screen representation for using the remaining battery power of the electronic device and the remaining battery power of an external device in aggregate. 1710 indicates a screen representation for the electronic device being not coupled with an external device.

As indicated by 1700, a GUI element 1701 may be output on the screen to indicate coupling of an external device. A GUI element 1702 may also be output on the screen to indicate the sum of the remaining battery power of the electronic device and that of the external device. The color of the GUI element 1702 may be different when it indicates the sum of remaining battery powers from when it indicates the remaining battery power without summing.

In embodiments, when an external device is coupled to the electronic device, the functionality related to the external device may be adjusted regardless of the first power mode or the second power mode.

After an external device is coupled to the electronic device 101, the power of the power source may be consumed to execute a function of the external device regardless of presence of a battery in the external device. In this case, if the remaining battery power becomes less than or equal to a given level, it is possible to increase the overall usage time by adjusting the functionality of the external device. To this end, some computation may be performed using a power consumption table (current/battery table) for the external device. The current/battery table may be prepared for each external device. If a current/battery table is not present for an external device, the amount of power consumption may be recorded and a current/battery table may be derived later from the recorded information.

Figure 18:
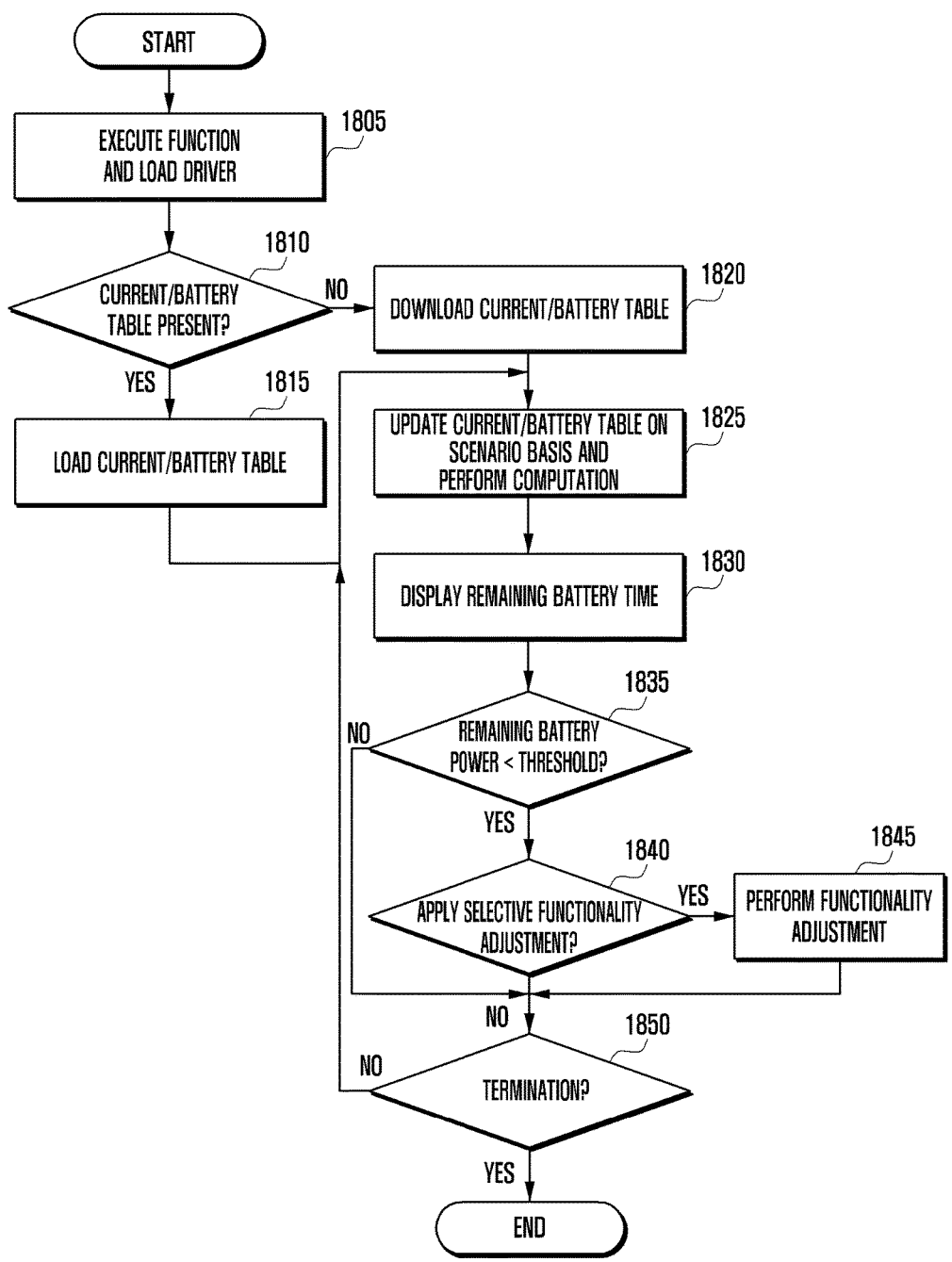
FIG. 18 illustrates a procedure for functionality adjustment based on table values according to embodiments of the present disclosure.

FIG. 18 illustrates a procedure for functionality adjustment performed when an external device is coupled to the electronic device according to embodiments of the present disclosure.

Upon detection of coupling of an external device, at step 1805, the processor 120 of the electronic device 101 executes a corresponding function, such as a shooting application when the external device is a camera, and loads a corresponding driver. At step 1810, the processor 120 determines whether a current/battery table is present in the external device or electronic device 101. If a current/battery table is present, at step 1815, the processor 120 loads the current/battery table. At step 1825, the processor 120 updates the current/battery table and performs a computation on a scenario basis.

If a current/battery table is not present, at step 1820, the processor 120 downloads a current/battery table from the Web, and at t step 1825, when the external device includes a camera, the current/battery table values may be used to compute the amount of current consumption due to video shooting for unit time, photographic lighting for unit time, and preview image display for unit time. In addition, at step 1825, when a function using the external device is executed, the amount of current consumed by the function may be recorded and be accumulated to the existing information. Thereby, it is possible to improve the accuracy of information regarding the amount of current consumption per function.

After computing the amount of current consumption per function, at step 1830, the processor 120 displays the expected remaining battery time.

Thereafter, at step 1835, the processor 120 determines whether the remaining battery power is less than a preset threshold. If the remaining battery power is not less than the preset threshold, the procedure proceeds to step 1850 where it is determined whether to terminate the process. If the remaining battery power is less than the preset threshold, at step 1840, the processor 120 determines whether to apply selective functionality adjustment, such as according to a user request. Upon determining to apply selective functionality adjustment, at step 1845, the processor 120 performs functionality adjustment. Thereafter, at step 1850, the processor 120 determines whether a termination request is issued.

In FIG. 18, steps 1610 to 1630 related to display of the remaining battery time may be performed independently of steps 1835 to 1845 related to functionality adjustment. For example, functionality adjustment may be performed when the remaining battery power becomes less than a preset threshold even in the absence of a current/battery table. However, in the embodiment described in FIG. 18, functionality adjustment at step 1845 is performed with respect to the current/battery table. For example, when the remaining battery power becomes less than the preset threshold, to reduce current consumption, the processor 120 may lower the resolution of the preview image with reference to the information provided in the current/battery table.

The following are aspects according to embodiments of the present disclosure:

A method of function control for an electronic device in consideration of an external device coupled to the electronic device may include electrically connecting the external device to the electronic device, determining, upon detecting electrical connection, whether the external device has a second power source, supplying, when the external device has a second power source, a first level of power from the second power source to a power management integrated circuit of the electronic device, and supplying, when the external device does not have a second power source, a second level of power from a first power source of the electronic device to the power management integrated circuit.

A method of function control for an electronic device having a camera in consideration of a camera-equipped external device coupled to the electronic device may include electrically connecting the external device to the electronic device, executing a piece of software for interworking between the camera of the external device and the camera of the electronic device, and outputting a user interface on a touchscreen display of the electronic device to receive user input for controlling camera interworking.

A method of function control for an electronic device in consideration of an external device coupled to the electronic device may include sensing electrical connection of the external device, determining whether the external device has a second power source, and controlling usage of a first power source of the electronic device according to the result of determination.

A method of function control for an electronic device in consideration of an external device coupled to the electronic device may include sensing electrical connection of the external device, executing, when the external device is electrically connected, a piece of software associated with the external device, outputting a user interface to receive user input for controlling the external device, and controlling at least one function of the piece of software in association with the external device.

In the present disclosure, when an external device is coupled to the mobile device, it is possible to control at least one function of the mobile device in a manner suitable for the external device. In particular, according to the type or state of the 1i external device coupled to the mobile device, a selection is made between usage of the power source of the external device and usage of the power source of the mobile device or low-power mode is initiated automatically. Hence, it is possible to increase efficiency of power usage.

Specific terms or words used in the above description should be construed in accordance with the spirit of the present disclosure without limiting the subject matter thereof.

While the present disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing including a first face and a second face in an opposite direction of the first face;
   a connector placed on the first face of the housing to removably receive an external device;
   a first power source arranged in the housing;
   a power management integrated circuit electrically connected with the first power source;
   a processor electrically connected with the first power source and the power management integrated circuit; and
   a memory electrically connected with the processor,
   wherein the memory stores instructions that, when executed, cause the processor to perform a process of determining whether the external device has a second power source, supplying, when the external device has a second power source, a first level of power from the second power source to the power management integrated circuit, and supplying, when the external device does not have a second power source, a second level of power from the first power source to the power management integrated circuit.

2. The electronic device of claim 1, wherein the first level of power differs from the second level of power in terms of at least one of the amount of power to be supplied, the time of supply, and the frequency of supply.

3. The electronic device of claim 1, wherein, when the external device has the second power source, the processor requests the external device to supply a third level of power from the second power source to the electronic device.

4. The electronic device of claim 1, wherein, when the external device is a standalone device, the processor controls the first power source to supply a third level of power to the power management integrated circuit.

5. The electronic device of claim 1, wherein, when the external device has the second power source, the processor compares the amount of power that may be supplied by the first power source with the amount of power that may be supplied by the second power source, and supplies a third level of power or a fourth level of power from the first power source to the power management integrated circuit according to a result of the comparison.

6. An electronic device comprising:
   an interface part that electrically contacts an external device; and
   a processor that determines, when the external device is electrically connected, whether the external device has a second power source, configures, when the external device has a second power source, a first power mode to select the power source to be used from among a first power source and the second power source, and configures, when the external device does not have the second power source, a second power mode to reduce current drawn from the first power source by controlling at least one function related to the external device.

7. The electronic device of claim 6, wherein, in the first power mode, the processor determines to use the battery of the external device when remaining power of the second power source is greater than remaining power of the first power source, the remaining power of the first power source is less than or equal to a preset threshold, and the remaining power of the second power source is greater than the threshold, and determines to use the battery of the electronic device in any other instance.

8. The electronic device of claim 6, wherein the processor determines to use a power source selected by the user for power supply.

9. The electronic device of claim 6, wherein, when the external device is electrically connected and has the second power source, the processor sums the remaining power of the first power source and the remaining power of the second power source and computes an amount of current consumed based on an aggregate of the remaining powers.

10. The electronic device of claim 6, further comprising a memory to store information sent to or received from the external device, and wherein, when the external device is electrically connected and a per-function current consumption table of the external device is received from the external device, the processor computes and displays an expected remaining time of the power source in use with reference to the received table.

11. The electronic device of claim 10, wherein, when a function is executed using the external device, the processor records information on the amount of current consumed per unit time, updates the current consumption table based on the recorded information, and stores the updated current consumption table in the memory.

12. The electronic device of claim 6, wherein, when the external device is electrically connected, the processor receives identification (ID) information of the external device and examines the received ID information, and wherein the ID information includes information regarding at least one of functions supported by the external device, applications designed for interworking, and presence of a power source.

13. The electronic device of claim 6, wherein the external device is one of devices supporting at least one of functions related to a camera, speaker, storage medium, sensor, and electronic payment, and wherein the external device is electrically connected to the electronic device by at least one of coupling using a battery pack shape, coupling as an external cover of the electronic device, coupling as a modular component, coupling using a pin shape, and wireless link based on close proximity communication.

14. The electronic device of claim 6, wherein the processor that executes, when an external device is electrically connected, a piece of software associated with the external device, outputs a user interface to receive user input for controlling the external device, and controls at least one function of the piece of software in association with the external device.

15. The electronic device of claim 14, wherein the interface part is designed to identify a coupling scheme of the external device in terms of at least one of coupling direction and coupling site, and wherein the processor controls at least one function of a piece of software automatically executed at a time of coupling according to the identified coupling scheme.

* * * * *